United States Patent
Kamada

(10) Patent No.: US 9,248,744 B2
(45) Date of Patent: Feb. 2, 2016

(54) CONTROL APPARATUS FOR SWITCHED RELUCTANCE MOTOR

(71) Applicant: DENSO CORPORATION, Kariya, Aichi-pref. (JP)

(72) Inventor: Yoshinobu Kamada, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 153 days.

(21) Appl. No.: 14/229,189

(22) Filed: Mar. 28, 2014

(65) Prior Publication Data

US 2014/0292244 A1  Oct. 2, 2014

(30) Foreign Application Priority Data

Mar. 29, 2013  (JP) ................................ 2013-074808

(51) Int. Cl.
| | |
|---|---|
| H02P 23/00 | (2006.01) |
| B60L 1/00 | (2006.01) |
| H02P 27/08 | (2006.01) |
| H02P 6/16 | (2006.01) |
| H02P 25/08 | (2006.01) |

(52) U.S. Cl.
CPC ... *B60L 1/00* (2013.01); *H02P 6/16* (2013.01); *H02P 25/085* (2013.01); *H02P 27/08* (2013.01); *H02P 2209/07* (2013.01)

(58) Field of Classification Search
CPC ......... H02P 27/02; H02P 25/04; H02P 27/08; H02M 7/53875; H02M 7/48
USPC ........................... 318/811, 599, 812, 808, 806
See application file for complete search history.

(56) References Cited

U.S. PATENT DOCUMENTS

| | | | | | |
|---|---|---|---|---|---|
| 6,163,128 | A | * | 12/2000 | Hiti | ..................... B60L 11/1803 318/433 |
| 6,762,573 | B2 | * | 7/2004 | Patel | ....................... H02P 6/183 318/400.02 |
| 2010/0138127 | A1 | * | 6/2010 | Boughtwood | .......... B60L 7/006 701/71 |
| 2011/0248659 | A1 | * | 10/2011 | Balazovic | ............... H02P 6/183 318/400.33 |

FOREIGN PATENT DOCUMENTS

JP          5050455          10/2012

OTHER PUBLICATIONS

"Drive circuit technology and control technology for permanent magnetic motors and reluctance motors", Technical report of the Institute of Electrical Engineers of Japan, No. 1034, Oct. 24, 2005, pp. 54-56 (with English translation, 23 pages.

* cited by examiner

*Primary Examiner* — Rina Duda
(74) *Attorney, Agent, or Firm* — Nixon & Vanderhye PC

(57) ABSTRACT

A control apparatus is provided for controlling a multi-phase, switched reluctance motor. The control apparatus includes voltage adjusters, a controller, and a carrier signal generator. Each of the voltage adjusters adjusts a voltage applied to a corresponding one of voltage application targets on the same salient pole of a stator of the motor. The controller controls each of the voltage adjusters via a pulse-width modulation based on comparison between a command signal and a corresponding one of carrier signals, thereby controlling the voltage applied to the corresponding voltage application target to a command voltage indicated by the command signal. The carrier signal generator generates the carrier signals so that for at least one pair of the voltage application targets on the same salient pole of the stator, two of the carrier signals which respectively correspond to the pair of the voltage application targets are offset in phase from each other.

7 Claims, 13 Drawing Sheets

APPLYING POSITIVE VOLTAGE

APPLYING ZERO VOLTAGE

APPLYING NEGATIVE VOLTAGE (a) IDEAL (b) 1ST EMBODIMENT
(20kHz)

(c) WITHOUT OFFSETTING PHASES OF
CARRIER SIGNALS
(20kHz)

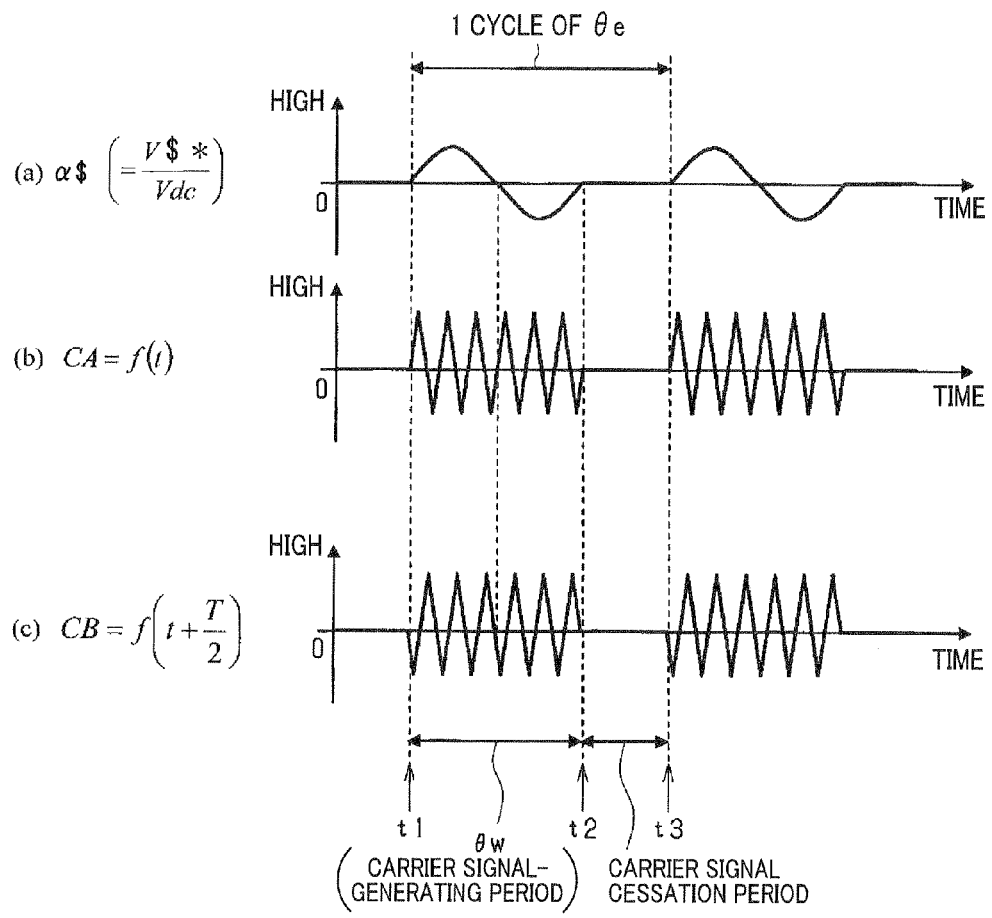

CONTROL APPARATUS FOR SWITCHED RELUCTANCE MOTOR

CROSS-REFERENCE TO RELATED APPLICATION

This application is based on and claims priority from Japanese Patent Application No. 2013-74808 filed on Mar. 29, 2013, the content of which is hereby incorporated by reference in its entirety into this application.

BACKGROUND

1 Technical Field

The present invention relates to control apparatuses for switched reluctance motors which include a stator having a plurality of pairs of opposing salient poles, each pair of the opposing salient poles having a plurality of coils of the same phase wound thereon, and a rotor arranged so as to be rotatable relative to the stator.

2 Description of the Related Art

Japanese Patent No. 5050455 discloses a control apparatus for a SR (Switched Reluctance) motor. The SR motor includes a stator that has two pairs of opposing salient poles for each of three phases. Each of the salient poles has one coil wound thereon. Moreover, for each pair of the opposing salient poles, the two coils respectively wound on the opposing salient poles of the pair are of the same phase.

The control apparatus is configured to include a plurality of drive circuits (or hysteresis comparator circuits) each of which corresponds to one of the coils wound on the salient poles of the stator of the SR motor. Moreover, for each pair of the opposing salient poles of the stator, the phases of energizing and de-energizing operations of the drive circuit corresponding to one of the two coils respectively wound on the opposing salient poles of the pair are set different from those of energizing and de-energizing operations of the drive circuit corresponding to the other coil. Consequently, it is possible to reduce ripple of electric current flowing to a capacitor that is electrically connected in parallel with the coils wound on the salient poles of the stator.

However, with the above configuration, since the energizing and de-energizing operations of the drive circuits are alternately performed, the flux linkage waveforms of the coils may be distorted. In this case, the flux linkage waveforms of the coils contain many harmonics, thereby increasing the iron loss of the SR motor due to the harmonics.

SUMMARY

According to an exemplary embodiment, there is provided a control apparatus for a multi-phase, switched reluctance motor. The motor includes a stator and a rotor that is arranged so as to be rotatable relative to the stator. The stator has a plurality of pairs of opposing salient poles; each pair of the opposing salient poles has a plurality of coils of the same phase wound thereon. Further, each of the salient poles of the stator has a predetermined number of the same-phase coils wound thereon. The predetermined number of the same-phase coils are divided into a plurality of voltage application targets. The control apparatus includes a plurality of voltage adjusters, a controller, and a carrier signal generator. Each of the voltage adjusters adjusts a voltage applied to a corresponding one of the voltage application targets on the same salient pole of the stator. The controller controls each of the voltage adjusters via a pulse-width modulation based on comparison between a command signal and a corresponding one of a plurality of carrier signals, thereby controlling the voltage applied to the corresponding voltage application target to a command voltage that is indicated by the command signal. The carrier signal generator generates the carrier signals so that for at least one pair of the voltage application targets on the same salient pole of the stator, two of the carrier signals which respectively correspond to the pair of the voltage application targets are offset in phase from each other.

With the above configuration, since the controller controls each of the voltage adjusters via the pulse-width modulation based on comparison between the command signal and the corresponding carrier signal, it is generally easy for the waveform of the flux linkage of the corresponding voltage application target to contain harmonics which cause the iron loss of the motor to increase.

However, according to the exemplary embodiment, the carrier signal generator generates the carrier signals so that for at least one pair of the voltage application targets on the same salient pole of the stator, the two carrier signals which respectively correspond to the pair of the voltage application targets are offset in phase from each other. Consequently, it becomes possible to smooth the change of the resultant flux linkage of the pair of the voltage application targets, thereby reducing the iron loss of the motor due to the harmonics.

Moreover, with the above configuration, since the pair of the voltage application targets are arranged on the same salient pole of the stator, it becomes possible to increase magnetic fluxes that flow in a magnetic circuit common to the pair of the voltage application targets and contribute to smoothing the change of the resultant flux linkage of the pair of the voltage application targets. That is, it becomes possible to more effectively smooth the change of the resultant flux linkage of the pair of the voltage application targets, thereby more effectively reducing the iron loss of the motor due to the harmonics.

Preferably, the carrier signal generator generates the carrier signals so that the two carrier signals are offset in phase from each other by $T/2^M$, where T is the period of the carrier signals and M is an integer not less than 1.

It is further preferable that M=1.

It is also preferable that the carrier signal generator generates the carrier signals so that for at least one pair of the voltage application targets which are respectively provided on one opposing pair of the salient poles of the stator, the two carrier signals which respectively correspond to the pair of the voltage application targets are offset in phase from each other by $T/2^N$, where N is an integer not less than 2.

In the above control apparatus, each cycle of electrical angle of the rotor of the motor may include a carrier signal-generating period and a carrier signal cessation period. The carrier signal generator continuously generates the carrier signals during the carrier signal-generating period and ceases generating the carrier signals during the carrier signal cessation period.

Each of the voltage adjusters may be configured with an upper arm switching element, a lower arm switching element, an upper arm rectifying element and a lower arm rectifying element. The upper arm switching element is connected between one end of the corresponding voltage application target and a positive terminal of a DC power source. The lower arm switching element is connected between the other end of the corresponding voltage application target and a negative terminal of the DC power source. The upper arm rectifying element is connected between one end of the upper arm switching element on the opposite side to the corresponding voltage application target and a junction point between the corresponding voltage application target and the lower arm switching element. The upper arm rectifying element is configured to allow electric current to flow in a direction from the lower arm switching element to the upper arm switching element while blocking electric current from flowing in the reverse direction. The lower arm rectifying element is connected between one end of the lower arm switching element on the opposite side to the corresponding voltage application target and a junction point between the corresponding voltage application target and the upper arm switching element. The lower arm rectifying element is also configured to allow electric current to flow in the direction from the lower arm switching element to the upper arm switching element while blocking electric current from flowing in the reverse direction. The controller may be configured to control, for each of the voltage adjusters, the on/off operation of at least one of the upper and lower arm switching elements of the voltage adjuster via the pulse-width modulation, thereby controlling the voltage applied to the corresponding voltage application target to the command voltage.

It is preferable that the command voltage is in the form of a sine wave both in its rising periods and in its falling periods and has its waveform continuous during each cycle of the electrical angle of the rotor of the motor.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 21 is a graphical representation illustrating a command signal and first and second carrier signals generated by a controller of a control apparatus according to a third embodiment.

DESCRIPTION OF EMBODIMENTS

Figure 1:
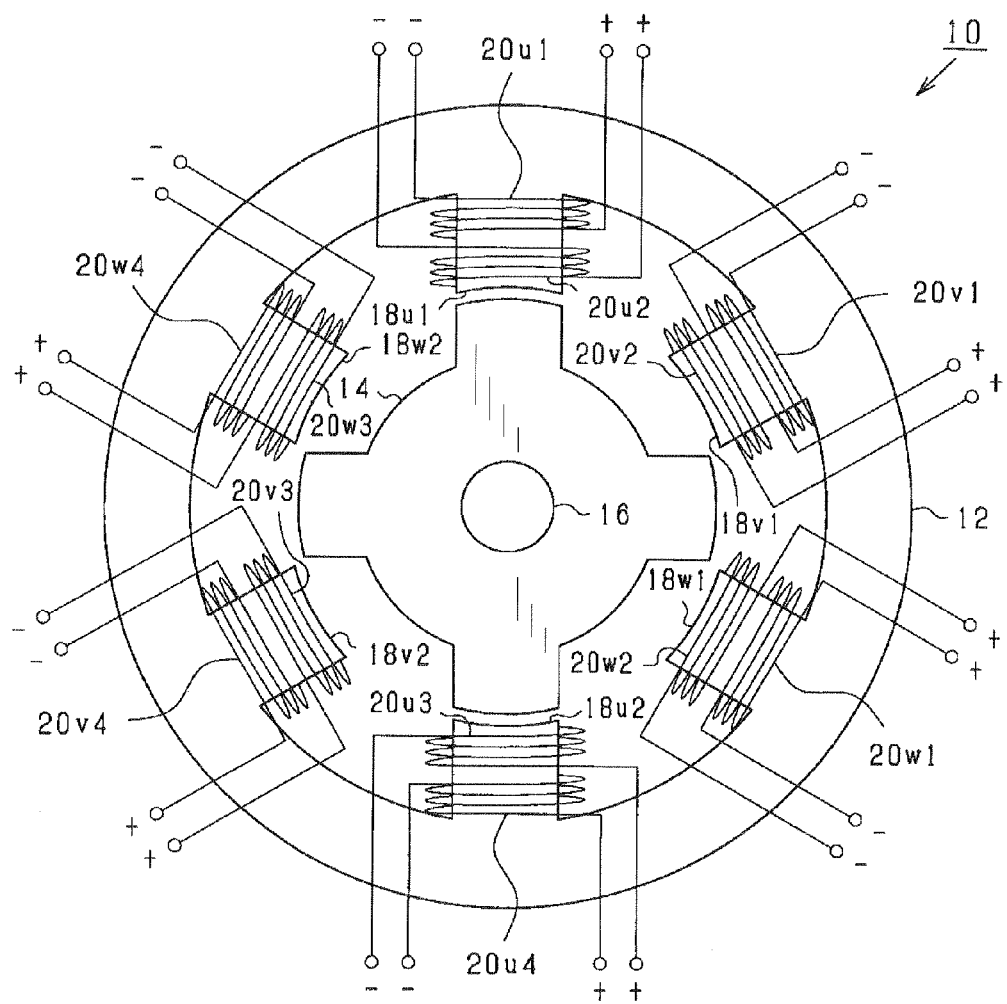
FIG. 1 is a schematic view illustrating the configuration of a SR motor according to a first embodiment.

Exemplary embodiments will be described hereinafter with reference to FIGS. 1-21. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

[First Embodiment]

FIG. 1 shows the overall configuration of a three-phase SR (Switched Reluctance) motor 10.

In the present embodiment, the SR motor 10 is configured as a motor-generator that functions as a main motive power source in a motor vehicle.

As shown in FIG. 1, the SR motor 10 includes a stator 12 and a rotor 14.

The rotor 14 is fixed on a rotating shaft 16 so as to be rotatable together with the rotating shaft 16 relative to the stator 12. The rotor 14 has a plurality (e.g., four) of salient poles that are formed on the radially outer periphery of the rotor 14 at equal intervals (e.g., 90°) in the circumferential direction of the rotor 14.

On the other hand, the stator 12 has a plurality (e.g., six) of teeth (or salient poles) that are formed on a radially inner periphery of the stator 12 at equal intervals (e.g., 60°) in the circumferential direction of the stator 12.

More specifically, in the present embodiment, the stator 12 has a pair of first and second U-phase teeth $18u1$ and $18u2$ opposing each other, a pair of first and second V-phase teeth $18v1$ and $18v2$ opposing each other, and a pair of first and second W-phase teeth $18w1$ and $18w2$ opposing each other.

Moreover, on the first $-phase tooth $18\$1$ ($=u, v, w), there are wound first and second $-phase coils $20\$1$ and $20\$2$ in the same direction. Similarly, on the second $-phase tooth $18\$2$, there are wound third and fourth $-phase coils $20\$3$ and $20\$4$ in the same direction.

In addition, in FIG. 1, for each of the first to the fourth $-phase coils $20\$1$ to $20\$4$, the "+" symbol given at one end of the coil indicates that the end is connected to a positive terminal of a high-voltage battery 30 (to be described later), while the "−" symbol given at the other end of the coil indicates that the other end is connected to a negative terminal of the high-voltage battery 30.

Next, a control apparatus according to the present embodiment will be described with reference to FIG. 2.

In the present embodiment, the control apparatus is configured to control electric power supply from the high-voltage battery 30 to the SR motor 10.

The high-voltage battery 30 has a terminal voltage higher than or equal to 100V. For example, the terminal voltage may be equal to 288V. Moreover, the high-voltage battery 30 may be implemented by a secondary battery, such as a lithium-ion battery or a nickel hydride battery. In addition, the high-voltage battery 30 can be regarded as a DC power source.

To the high-voltage battery 30, there is connected, via a smoothing capacitor 32, a parallel connection of a U-phase electric power conversion circuit 40u, a V-phase electric power conversion circuit 40v and a W-phase electric power conversion circuit 40w.

The U-phase electric power conversion circuit 40u includes a serial connection of a first U-phase switching element Su1 and a second U-phase diode Du2, a serial connection of a first U-phase diode Du1 and a second U-phase switching element Su2, a serial connection of a third U-phase switching element Su3 and a fourth U-phase diode Du4, and a serial connection of a third U-phase diode Du3 and a fourth U-phase switching element Su4. In addition, each of the first to the fourth U-phase switching elements Su1-Su4 is implemented by, for example, an IGBT (Insulated-Gate Bipolar Transistor).

More specifically, in the U-phase electric power conversion circuit 40u, a junction point between the first U-phase switching element Su1 and the second U-phase diode Du2 is connected to a junction point between the first U-phase diode Du1 and the second U-phase switching element Su2 via a parallel connection of the first U-phase coil 20u1 and the third U-phase coil 20u3. Moreover, the emitter of the first U-phase switching element Su1 is connected to the cathode of the second U-phase diode Du2; the collector of the first U-phase switching element Su1 is connected to the positive terminal of the high-voltage battery 30; the anode of the second U-phase diode Du2 is connected to the negative terminal of the high-voltage battery 30. On the other hand, the anode of the first U-phase diode Du1 is connected to the collector of the second U-phase switching element Su2; the cathode of the first U-phase diode Du1 is connected to the positive terminal of the high-voltage battery 30; the emitter of the second U-phase switching element Su2 is connected to the negative terminal of the high-voltage battery 30.

Similarly, a junction point between the third U-phase switching element Su3 and the fourth U-phase diode Du4 is connected to a junction point between the third U-phase diode Du3 and the fourth U-phase switching element Su4 via a parallel connection of the second U-phase coil 20u2 and the fourth U-phase coil 20u4. Moreover, the emitter of the third U-phase switching element Su3 is connected to the cathode of the fourth U-phase diode Du4; the collector of the third U-phase switching element Su3 is connected to the positive terminal of the high-voltage battery 30; the anode of the fourth U-phase diode Du4 is connected to the negative terminal of the high-voltage battery 30. On the other hand, the anode of the third U-phase diode Du3 is connected to the collector of the fourth U-phase switching element Su4; the cathode of the third U-phase diode Du3 is connected to the positive terminal of the high-voltage battery 30; the emitter of the fourth U-phase switching element Su4 is connected to the negative terminal of the high-voltage battery 30.

The V-phase electric power conversion circuit 40v includes first, second, third and fourth V-phase switching elements Sv1-Sv4 and first, second, third and fourth V-phase diodes Dv1-Dv4, which are connected in the same manner as the first to the fourth U-phase switching elements Su1-Su4 and the first to the fourth U-phase diodes Du1-Du4 of the U-phase electric power conversion circuit 40u. The W-phase electric power conversion circuit 40w includes first, second, third and fourth W-phase switching elements Sw1-Sw4 and first, second, third and fourth W-phase diodes Dw1-Dw4, which are also connected in the same manner as the first to the fourth U-phase switching elements Su1-Su4 and the first to the fourth U-phase diodes Du1-Du4 of the U-phase electric power conversion circuit 40u. Therefore, for the sake of avoiding redundancy, descriptions of the electrical connection between the first to the fourth V-phase switching elements Sv1-Sv4 and the first to the fourth V-phase diodes Dv1-Dv4 and the electrical connection between the first to the fourth W-phase switching elements Sw1-Sw4 and the first to the fourth W-phase diodes Dw1-Dw4 are omitted hereinafter.

In addition, in the present embodiment, the first and third \$-phase (\$=U, V, W) diodes D\$1 and D\$3 can be regarded as upper arm rectifying elements of the control apparatus; the second and fourth \$-phase diodes D\$2 and D\$4 can be regarded as lower arm rectifying elements of the control apparatus; the first and third \$-phase switching elements S\$1 and S\$3 can be regarded as upper arm switching elements of the control apparatus; the second and fourth \$-phase switching elements S\$2 and S\$4 can be regarded as lower arm switching elements of the control apparatus. Moreover, each of the first to the fourth \$-phase coils 20\$1-20\$4 can be regarded as a voltage application target; the first and second \$-phase switching elements S\$1 and S\$2 and the first and second \$-phase diodes D\$1 and D\$2 can be regarded as together making up a voltage adjuster for adjusting voltage applied to the voltage application targets made up of the first and third \$-phase coils 20\$1 and 20\$3; the third and fourth \$-phase switching elements S\$3 and S\$4 and the third and fourth \$-phase diodes D\$3 and D\$4 can be regarded as together making up a voltage adjuster for adjusting voltage applied to the voltage application targets made up of the second and fourth \$-phase coils 20\$2 and 20\$4.

The controller 50 includes a CPU (Central Processing Unit) and a memory, none of which is shown in the drawings. The controller 50 has various programs stored in the memory and executes those programs by the CPU, thereby controlling a controlled variable (e.g., the output torque) of the SR motor 10 to its command value (e.g., command torque Trq*).

To the controller 50, there are inputted sensing values of various sensors. Those sensors include a voltage sensor 52 that senses the terminal voltage of the smoothing capacitor 32 (i.e., the output voltage of the high-voltage battery 30 or the input voltage of the U-phase, V-phase and W-phase electric power conversion circuits 40u, 40v and 40w) and a rotation angle sensor (abbreviated to R. A. S. in FIG. 2) 54 that senses the rotation angle (electrical angle θe) of the rotor 14 of the SR motor 10. In addition, the rotation angle sensor 54 may be implemented by, for example, a resolver.

Based on the inputted sensing values, the controller 50 controls the on/off operations of the switching elements S\$# (\$=U, V, W; #=1, 2, 3, 4) by outputting control signals g\$# respectively to the switching elements S\$#, so as to bring the output torque of the SR motor 10 into agreement with the command torque Trq*. In addition, the command torque Trq* is inputted to the controller 50 from a higher-level control apparatus (e.g., a control apparatus that governs running control of the vehicle).

Next, a process of the controller 50 for generating the control signals g\$# will be described with reference to FIG. 3.

It should be noted that the process of the controller 50 for generating the control signals g\$# is the same but performed separately for all the three phases of the SR motor 10.

Figure 3:
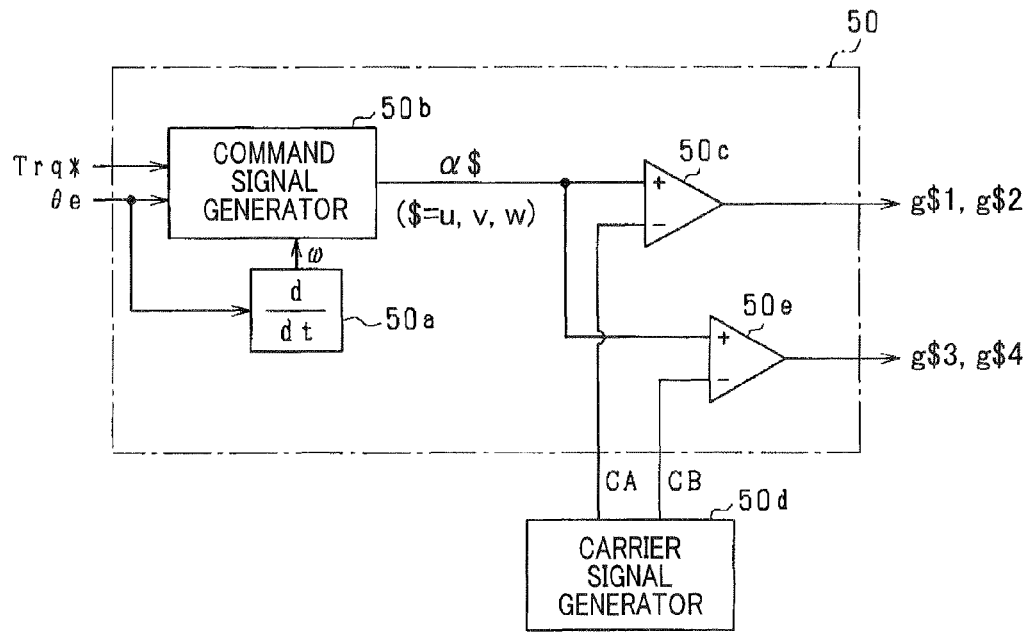
FIG. 3 is a block diagram illustrating a process of a controller of the control apparatus for generating control signals for controlling switching elements of the control apparatus.

As shown in FIG. 3, the controller 50 functionally includes an electrical angular speed computer 50a, a command signal generator 50*b*, a first PWM (Pulse-Width Modulation) comparator 50*c*, a second PWM comparator 50*e* and a carrier signal generator 50*d*.

The electrical angular speed computer 50*a* computes the electrical angular speed ω of the rotor 14 of the SR motor 10 by taking the time differential of the electrical angle θe sensed by the rotation angle sensor 54.

The command signal generator 50*b* generates, based on the command torque Trq*, the electrical angle θe and the electrical angular speed ω, a command signal α$ ($=u, v, w) which indicates a command voltage V$* for the first to the fourth $-phase coils 20$1-20$4. In addition, in the present embodiment, the generated command signals αu, αv and αw are offset in phase from each by an electrical angle of 120°.

The first PWM comparator 50*c* has a non-inverting input terminal via which the command signal α$ generated by the command signal generator 50*b* is inputted and an inverting input terminal via which a first carrier signal CA generated by the carrier signal generator 50*d* is inputted. The first PWM comparator 50*c* generates the control signals g$1 and g$2 for controlling the on/off operations of the first and second $-phase switching elements S$1 and S$2 via a pulse-width modulation based on comparison between the command signal α$ and the first carrier signal CA.

The second PWM comparator 50*e* has a non-inverting input terminal via which the command signal α$ generated by the command signal generator 50*b* is inputted and an inverting input terminal via which a second carrier signal CB generated by the carrier signal generator 50*d* is inputted. The second PWM comparator 50*e* generates the control signals g$3 and g$4 for controlling the on/off operations of the third and fourth $-phase switching elements S$3 and S$4 via a pulse-width modulation based on comparison between the command signal α$ and the second carrier signal CB.

The carrier signal generator 50*d* generates the first and second carrier signals CA and CB in the form of a triangular wave. In the present embodiment, each of the first and second carrier signals CA and CB has its minimum value set to [−1] and its maximum value set to [1]; both the first and second carrier signals CA and CB have the same frequency of, for example, 20 kHz. In addition, the manner of generating the first and second carrier signals CA and CB by the carrier signal generator 50*d* will be described in detail later.

Next, the manner of setting the command voltage V$* ($=U, V, W) for the first to the fourth $-phase coils 20$1-20$4 according to the present embodiment will be described with reference to FIG. 4.

Figure 4:
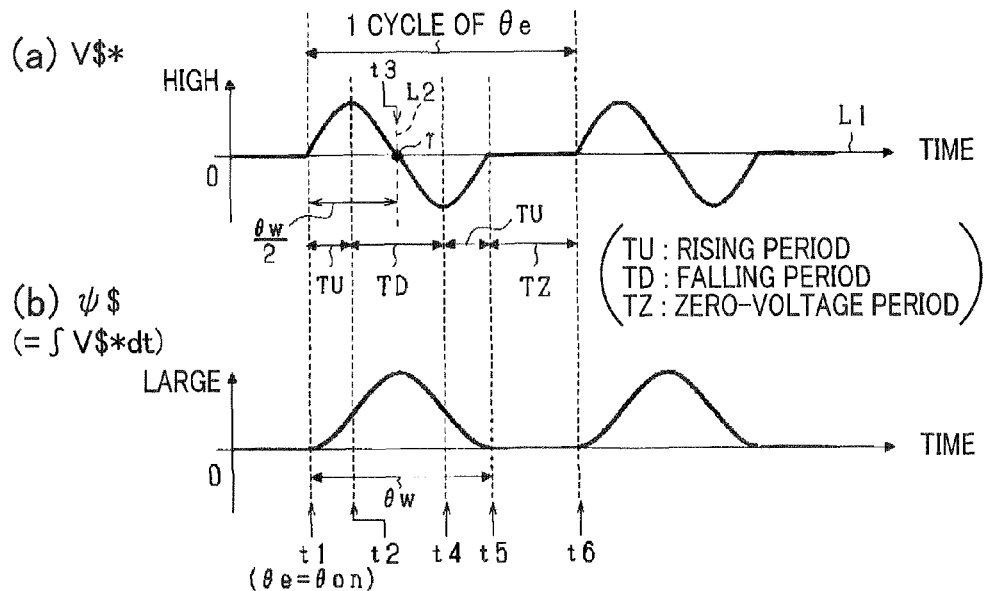
FIG. 4 is a graphical representation illustrating both the change with time of a command voltage for coils of a stator of the SR motor and the change with time of flux linkages of the coils of the stator.

In addition, in FIG. 4, (a) shows the change with time of the command voltage V$* with the electrical angular speed w of the rotor 14 of the SR motor 10 kept constant; (b) shows the change with time of the flux linkages ψ$ of the first to the fourth $-phase coils 20$1-20$4 with the electrical angular speed ω of the rotor 14 kept constant.

As shown in FIG. 4, in the present embodiment, the command voltage V$* is set so as to gradually change both in its rising periods TU (e.g., the periods between time instants t1 and t2 and between time instants t4 and t5) and in its falling periods TD (e.g., the period between the time instants t2 and t4). Moreover, the command voltage V$* is set so as to have its waveform continuous during each cycle of the electrical angle θe (e.g., during the period from the time instant t1 to a time instant t6). In addition, the rising periods TU denote those periods during which the command voltage V$* rises continuously (i.e., the change rate of the command voltage V$* is kept higher than zero); the falling periods TD denote those periods during which the command voltage V$* falls continuously (i.e., the change rate of the command voltage V$* is kept lower than zero).

In particular, in the present embodiment, the command voltage V$* is set so as to have first and second sine waveforms adjoining each other during an energization-commanding period θw. Here, the energization-commanding period θw denotes a period (e.g., the period between the time instants t1-t5) which is included in one cycle of the electrical angle θe and during which the controller 50 commands the electric power conversion circuits 40*u*-40*w* to energize the first to the fourth $-phase coils 20$1-20$4. The first sine waveform denotes the waveform of the command voltage V$* during a time period (e.g., the period between the time instants t1 and t3) in which the command voltage V$* is kept not lower than zero. The second sine waveform denotes the waveform of the command voltage V$* during a time period (e.g., the period between the time instants t3 and t5) in which the command voltage V$* is kept not higher than zero. The first and second sine waveforms are symmetric to each other with respect to a reference point γ; the reference point γ represents the intersection between a first reference line L1 which defines [0] (i.e., zero) of the command voltage V$* and a second reference line L2 which extends perpendicular to the reference line L1 through the center of the energization-commanding period θw. Moreover, the area of the region enclosed by the first sine waveform and the reference line L1 is equal to that of the region enclosed by the second sine waveform and the reference line L1. In addition, as shown in FIG. 4, each cycle of the electrical angle θe includes a zero-voltage period TZ during which the command voltage V$* is set to be equal to zero.

The command voltage V$* is set in the above manner for making the change with time of the flux linkages ψ$ of the first to the fourth $-phase coils 20$1-20$4 gentle and thereby reducing the iron loss of the SR motor 10 due to the harmonics contained the flux linkages ψ$. More specifically, the flux linkages ω$ of the first to the fourth $-phase coils 20$1-20$4 are determined by taking the time integral of the voltages applied to the first to the fourth $-phase coils 20$1-20$4. Therefore, it is possible to make the change with time of the flux linkages ψ$ gentle by setting the command voltage V$* to gradually change both in its rising periods TU and in its falling periods TD. In particular, by setting the command voltage V$* to have an ideal sine waveform, it is possible to cause the flux linkages ψ$ to have a sine waveform during each cycle of the electrical angle θe as shown in FIG. 4, thereby remarkably reducing the iron loss of the SR motor 10 due to the harmonics contained the flux linkages ψ$.

Figure 5:
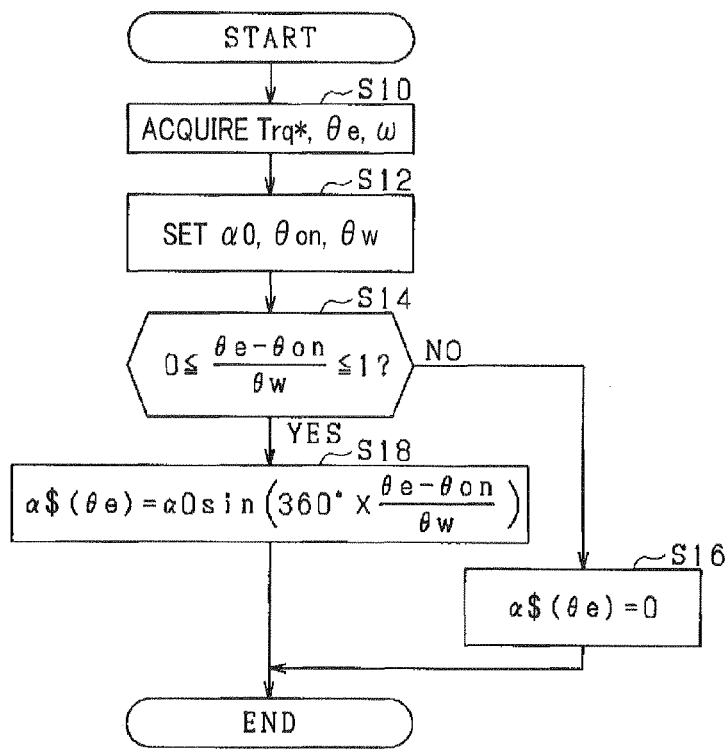
FIG. 5 is a flow chart illustrating a process of the controller for generating a command signal which indicates the command voltage for the coils of the stator.

Next, a process of the controller 50 for generating the command signal α$ ($=u, v, w) will be described with reference to FIG. 5.

This process is repeatedly performed by the command signal generator 50*b* of the controller 50 in a predetermined cycle. In addition, in the present embodiment, the command signal α$ represents the quotient of the command voltage V$* divided by the DC voltage Vdc outputted from the high-voltage battery 30.

First, at step S10, the command signal generator 50*b* acquires the command torque Trq*, the electrical angle θe of the rotor 14 of the SR motor 10 sensed by the rotation angle sensor 54 and the electrical angular speed ω of the rotor 14 computed by the electrical angular speed computer 50*a*.

Then, at step S12, based on the acquired command torque Trq*, electrical angle θe and electrical angular speed ω, the command signal generator 50b sets a command modulation factor α0, an ON phase θon and an energization-commanding width θw.

Here, the command modulation factor α0 denotes the quotient of the amplitude of the command voltage V$*, which is in the form of a sine wave, divided by the DC voltage Vdc outputted from the high-voltage battery 30. The ON phase θon denotes the electrical angle θe (corresponding to the time instant t1 in FIG. 1) at which the controller 50 commands start of energization of the first to the fourth $-phase coils 20$1-20$4. The energization-commanding width θw denotes the width of the electrical angle θe representing the energization-commanding period from the ON phase θon.

In addition, at this step, the command modulation factor α0, the ON phase θon and the energization-commanding width θw can be set using maps or formulas which specify the relationships between those parameters and the command torque Trq*, the electrical angle θe and the electrical angular speed ω.

At step S14, the command signal generator 50b determines whether the current electric angle θe falls within the energization-commanding period θw.

More specifically, at this step, the command signal generator 50b determines whether the current value of (θe−θon)/θw is greater than or equal to 0 and less than or equal to 1.

If the determination at step S14 results in a "NO" answer, then the process proceeds to step S16.

At step S16, the command signal generator 50b sets the magnitude of the command signal α$ to zero. Then, the process goes to the end.

On the other hand, if the determination at step S14 results in a "YES" answer, then the process goes on to step S18.

At step S18, the command signal generator 50b sets the magnitude of the command signal α$ to the current value of a0×sin(360°×(θe−θon)/θw). Then, the process goes to the end.

Next, a process of the controller 50 for controlling applied voltages of the first to the fourth $-phase coils 20$1-20$4 (i.e., voltages applied to the first to the fourth $-phase coils 20$1-20$4) to the command voltage V$* will be described with reference to FIG. 6.

This process is repeatedly performed by the controller 50 in a predetermined cycle. In addition, in the present embodiment, the on/off operations of the first and second $-phase switching elements S$1 and S$2 are controlled by the controller 50 in the same manner as those of the third and fourth $-phase switching elements S$3 and S$4. Therefore, for the sake of avoiding redundancy, the process will be described hereinafter by taking only the first and second $-phase switching elements S$1 and S$2 as an example.

First, at step S20, the controller 50 determines whether the magnitude of the command signal α$ is higher than or equal to zero.

If the determination at step S20 results in a "YES" answer, then at steps S22, S30 and S24, the controller 50 keeps the first $-phase switching element S$1 in an ON state while controlling the on/off operation of the second $-phase switching element S$2 via a pulse-width modulation based on comparison between the command signal α$ and the first carrier signal CA.

More specifically, at step S22, the controller 50 determines whether the magnitude of the command signal α$ is higher than or equal to that of the first carrier signal CA.

If the determination at step S22 results in a "YES" answer, then the process proceeds to step S30, at which the controller 50 turns the second $-phase switching element S$2 on while keeping the first $-phase switching element S$1 in the ON state. Thereafter, the process goes to the end.

Figure 7:
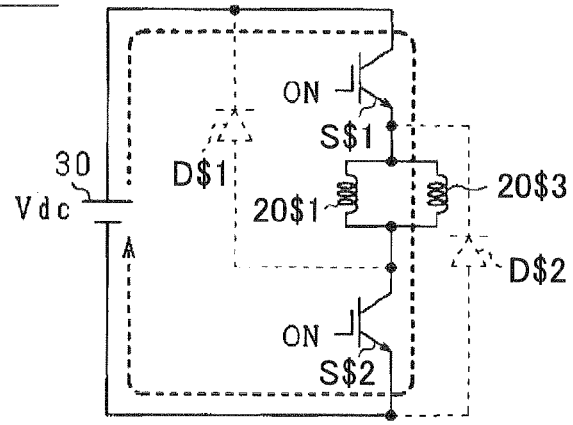
FIG. 7 is a schematic view illustrating a closed circuit formed to apply a positive voltage to the coils of the stator.

Consequently, as shown in FIG. 7, a closed circuit is formed which includes the high-voltage battery 30, the first $-phase switching element S$1, the parallel connection of the first and third $-phase coils 20$1 and 20$3, and the second $-phase switching element S$2. As a result, a positive voltage [Vdc] is applied to both the first and third $-phase coils 20$1 and 20$3 via the closed circuit.

In contrast, if the determination at step S22 results in a "NO" answer, then the process proceeds to step S24, at which the controller 50 turns the second $-phase switching element S$2 off while keeping the first $-phase switching element S$1 in the ON state. Thereafter, the process goes to the end.

Figure 8:
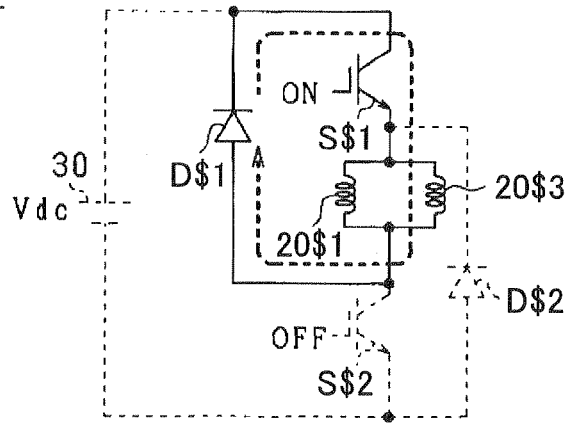
FIG. 8 is a schematic view illustrating a closed circuit formed to apply zero voltage to the coils of the stator.

Consequently, as shown in FIG. 8, a closed circuit is formed which includes the parallel connection of the first and third $-phase coils 20$1 and 20$3, the first $-phase diode D$1 and the first $-phase switching element S$1. As a result, a zero voltage is applied to both the first and third $-phase coils 20$1 and 20$3 via the closed circuit.

On the other hand, if the determination at step S20 results in a "NO" answer, then at steps S26, S28 and S24, the controller 50 keeps the second $-phase switching element S$2 in an OFF state while controlling the on/off operation of the first $-phase switching element S$1 via a pulse-width modulation based on comparison between the sign-inverted (or negated) command signal α$ and the first carrier signal CA.

More specifically, at step S26, the controller 50 determines whether the magnitude of the sign-inverted command signal α$ is higher than or equal to that of the first carrier signal CA.

If the determination at step S26 results in a "YES" answer, then the process proceeds to step S28, at which the controller 50 turns the first $-phase switching element S$1 off while keeping the second $-phase switching element S$2 in the OFF state. Thereafter, the process goes to the end.

Figure 9:
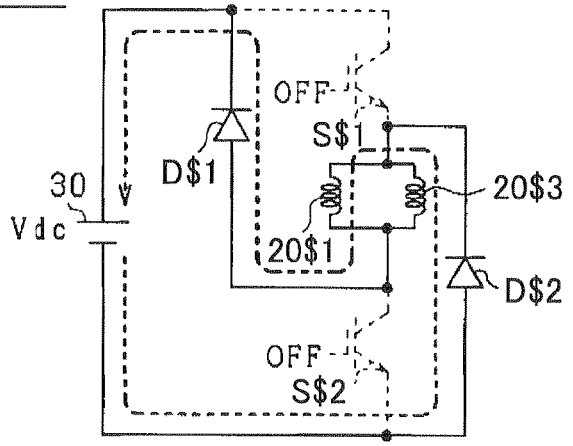
FIG. 9 is a schematic view illustrating a closed circuit formed to apply a negative voltage to the coils of the stator.

Consequently, as shown in FIG. 9, a closed circuit is formed which includes the high-voltage battery 30, the second $-phase diode D$2, the parallel connection of the first and third $-phase coils 20$1 and 20$3, and the first $-phase diode D$1. As a result, a negative voltage [−Vdc] is applied to both the first and third $-phase coils 20$1 and 20$3 via the closed circuit.

In contrast, if the determination at step S26 results in a "NO" answer, then the process proceeds to step S24, at which the controller 50 turns the first $-phase switching element S$1 on while keeping the second $-phase switching element S$2 in the OFF state. Thereafter, the process goes to the end.

Consequently, as described previously with reference to FIG. 8, the zero voltage is applied to both the first and third $-phase coils 20$1 and 20$3 via the closed circuit which includes the parallel connection of the first and third $-phase coils 20$1 and 20$3, the first $-phase diode D$1 and the first $-phase switching element S$1.

By performing the above process, the controller 50 controls the average applied voltage of each of the first and third $-phase coils 20$1 and 20$3 for each cycle of the first carrier signal CA to the command voltage V$*.

Figure 10:
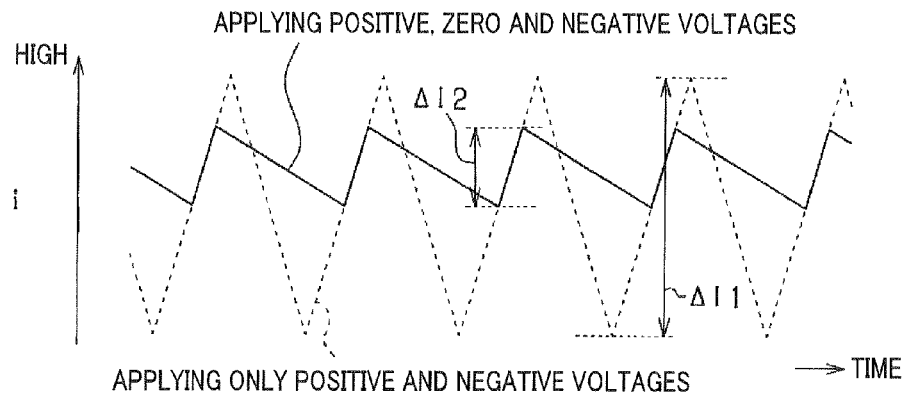
FIG. 10 is a schematic view illustrating an advantageous effect of using the zero voltage in addition to the positive and negative voltages.

As described above, in the present embodiment, the pair of the positive voltage [Vdc] and the zero voltage and the pair of the negative voltage [−Vdc] and the zero voltage are selectively applied to the first to the fourth $-phase coils 20$1-20$4 according to the sign of the command signal α$. Consequently, as shown in FIG. 10, the variation (or the peak-to-peak amplitude) ΔI2 of the electric current flowing in each of the first to the fourth $-phase coils 20$1-20$4 is considerably reduced in comparison with the variation ΔI1 of the same in the case of applying only the positive and negative voltages

[Vdc] and [−Vdc] to those coils 20$1-20$4. Thus, it becomes possible to accurately control the average applied voltages of the first to the fourth $-phase coils 20$1-20$4 for each cycle of the first carrier signal CA or the second carrier signal CB to the command voltage V$*. As a result, it becomes possible to make the waveforms of the flux linkages ψ$ of the first to the fourth $-phase coils 20$1-20$4 approximate to a sine waveform, thereby reducing the iron loss of the SR motor 10 due to the harmonics contained the flux linkages ψ$. In addition, it should be noted that of the electric current flowing in each of the first to the fourth $-phase coils 20$1-20$4, only the harmonic having a frequency in the vicinity of the carrier frequency (or the carrier first harmonic) is shown in FIG. 10.

Next, the manner of generating the first and second carrier signals CA and CB by the carrier signal generator 50d of the controller 50 will be described with reference to FIG. 11.

Figure 11:
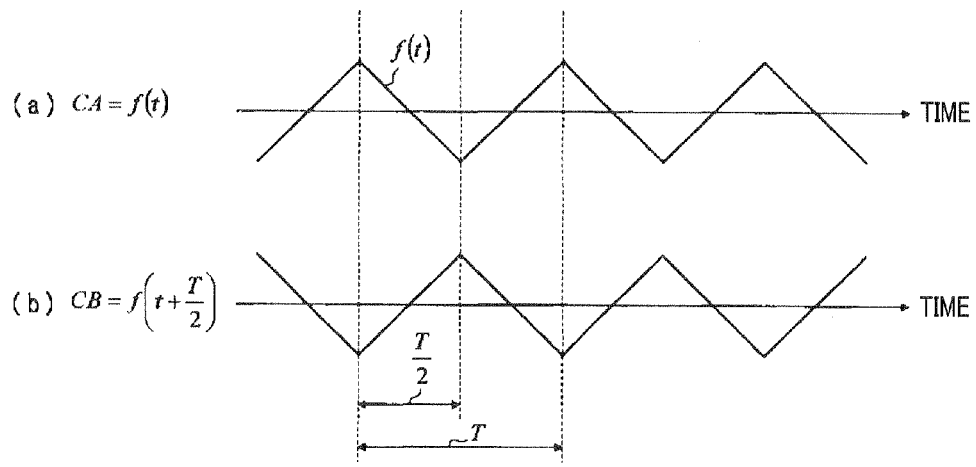
FIG. 11 is a graphical representation illustrating first and second carrier signals generated by the controller.

In addition, in FIG. 11, (a) shows the change with time of the first carrier signal CA, while (b) shows the change with time of the second carrier signal CB.

As shown in FIG. 11, in the present embodiment, the carrier signal generator 50d of the controller 50 generates the first and second carrier signals CA and CB so that the phases of the first and second carrier signals CA and CB are offset from each other by half the period T of the first and second carrier signals CA and CB.

Specifically, in controlling the applied voltages of the first to the fourth $-phase coils 20$1-20$4 to the command voltage V$* via the pulse-width modulations as described above, there is a concern that the waveforms of the flux linkages ψ$ of the first to the fourth $-phase coils 20$1-20$4 contain harmonics which cause the iron loss of the SR motor 10 to increase; those harmonics have frequencies that are nearly a $2^{(M-1)}$-multiple of the carrier frequency (or they are the carrier $2^{(M-1)}$-th harmonics), where M is an integer not less than 1. Therefore, in the present embodiment, the phases of the first and second carrier signals CA and CB are set so as to be offset from each other by the quotient of the period T of the carrier signals CA and CB divided by the M-th power of 2 (i.e., by $T/2^M$), thereby eliminating the carrier $2^{(M-1)}$-th harmonic from the electric current flowing in the first to the fourth $-phase coils 20$1-20$4 and thus the carrier $2^{(M-1)}$-th harmonic from the resultant flux linkages of corresponding pairs of those coils 20$1-20$4. More particularly, in the present embodiment, the phases of the first and second carrier signals CA and CB are offset from each other by T/2 (i.e., M=1), thereby eliminating the carrier first (i.e., $2^{(1-1)}$-th) harmonic from both the resultant flux linkage of the first and second $-phase coils 20$1 and 20$2 and the resultant flux linkage of the third and fourth $-phase coils 20$3 and 20$4.

Figure 12:
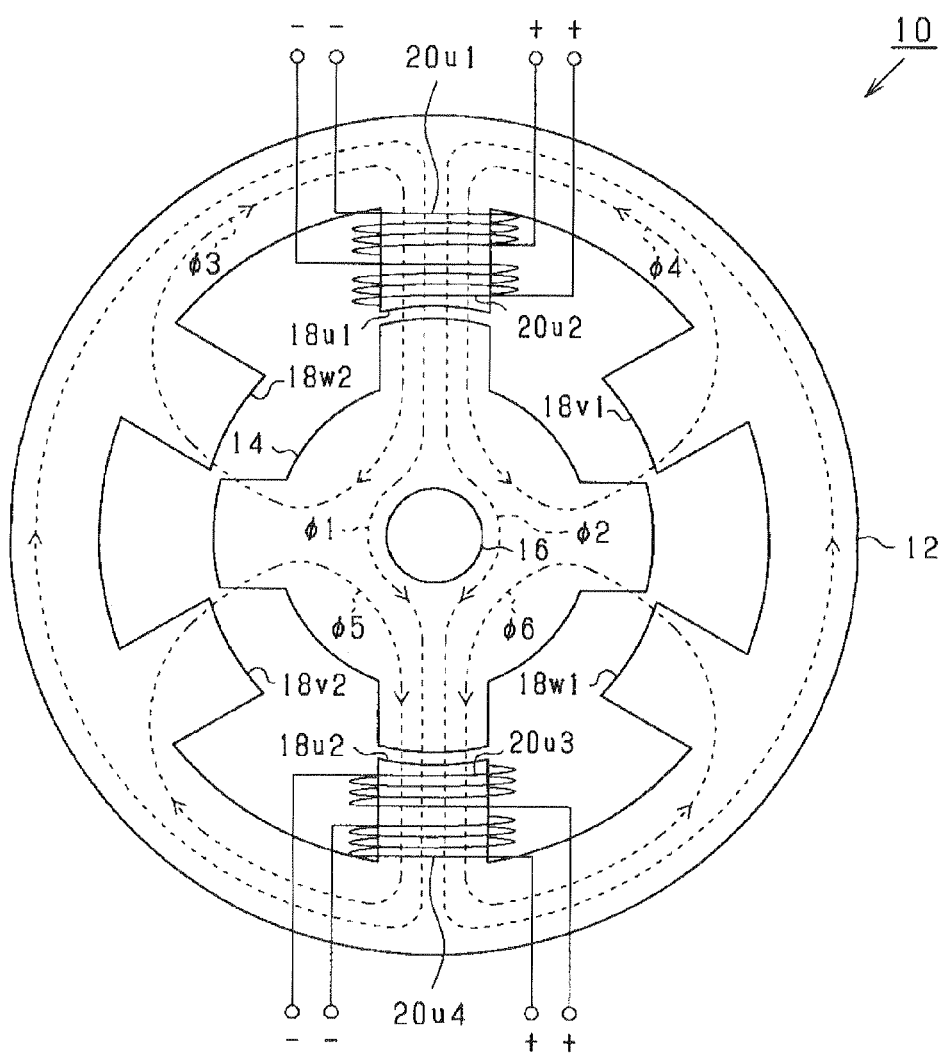
FIG. 12 is a schematic view illustrating magnetic fluxes flowing in the SR motor.

More specifically, in the present embodiment, both the first and second coils 20$1 and 20$2 (or the third and fourth coils 20$3 and 20$4) of the same phase are wound on the same tooth, i.e., the first $-phase tooth 18$1 (or the second $-phase tooth 18$2). Therefore, the first and second coils 20$1 and 20$2 (or the third and fourth coils 20$3 and 20$4) are magnetically connected with each other via the first $-phase tooth 18$1 (or the second $-phase tooth 18$2). Consequently, when electric power is supplied to the first and second coils 20$1 and 20$2 (or the third and fourth coils 20$3 and 20$4), there is formed a magnetic circuit common to the first and second coils 20$1 and 20$2 (or the third and fourth coils 20$3 and 20$4) in the SR motor 10. More specifically, as shown in FIG. 12, by taking the U phase as an example, when electric power is supplied to the first to the fourth $-phase coils 20$1-20$4, there are created magnetic fluxes φ1-φ6 in the SR motor 10. Since both the first and second coils 20$1 and 20$2 (or the third and fourth coils 20$3 and 20$4) are wound on the first $-phase tooth 18$1 (or the second $-phase tooth 18$2), it is possible to increase the magnetic fluxes φ1-φ4 (or φ1, φ2, φ5, φ6) that contribute to smoothing the change of the resultant flux linkage of the first and second coils 20$1 and 20$2 (or the third and fourth coils 20$3 and 20$4). That is, for each of the pair of the first and second coils 20$1 and 20$2 and the pair of the third and fourth coils 20$3 and 20$4, it is possible to smooth the change of the resultant flux linkage of the pair of the coils, thereby more effectively eliminating the carrier first harmonic from the resultant flux linkage. As a result, it is possible to more effectively reduce the iron loss of the SR motor 10 due to the first magnetic.

Next, the advantageous effects of offsetting the phases of the first and second carrier signals CA and CB from each other will be described with reference to FIGS. 13-16.

Figure 13:
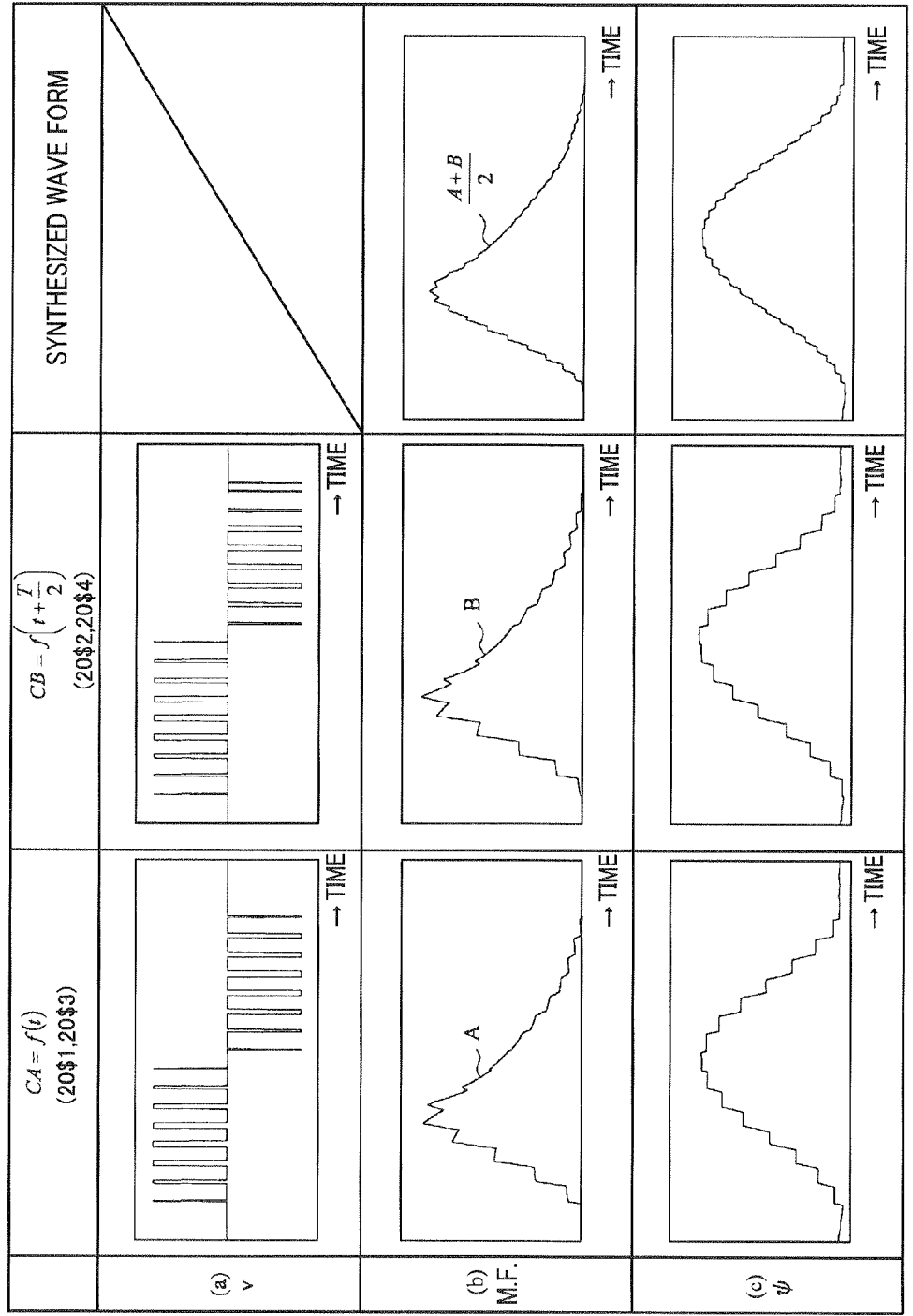
FIGS. 13, 14, 15 and 16 are schematic views illustrating the advantageous effects of offsetting the phases of the first and second carrier signals from each other.

FIG. 13 shows the changes with time of the applied voltages of the first to the fourth $-phase coils 20$1-20$4, the changes with time of the magnetomotive forces (abbreviated to M.F. in FIG. 13) of the first to the fourth $-phase coils 20$1-20$4, and the changes with time of the flux linkages of the first to the fourth $-phase coils 20$1-20$4. In addition, all of the changes shown in FIG. 13 are made with both the rotational speed of the rotor 14 and the command torque Trq* of the SR motor 10 kept constant.

More specifically, in FIG. 13, (a) shows both the waveform of the applied voltage of each of the first and third $-phase coils 20$1 and 20$3 and the waveform of the applied voltage of each of the second and fourth $-phase coils 20$2 and 20$4; (b) shows the waveform of the magnetomotive force of each of the first and third $-phase coils 20$1 and 20$3, the waveform of the magnetomotive force of each of the second and fourth $-phase coils 20$2 and 20$4, and a synthesized waveform that is obtained by synthesizing the aforementioned two waveforms of the magnetomotive forces; (c) shows the waveform of the flux linkage of each of the first and third $-phase coils 20$1 and 20$3, the waveform of the flux linkage of each of the second and fourth $-phase coils 20$2 and 20$4, and a synthesized waveform that is obtained by synthesizing the aforementioned two waveforms of the flux linkages. In addition, as described previously, the applied voltage of each of the first and third $-phase coils 20$1 and 20$3 is controlled by the controller 50 to the command voltage V$* via the pulse-width modulation based on comparison between the command signal α$ and the first carrier signal CA; the applied voltage of each of the second and fourth $-phase coils 20$2 and 20$4 is controlled by the controller 50 to the command voltage V$* via the pulse-width modulation based on comparison between the command signal α$ and the second carrier signal CB.

Figure 14:
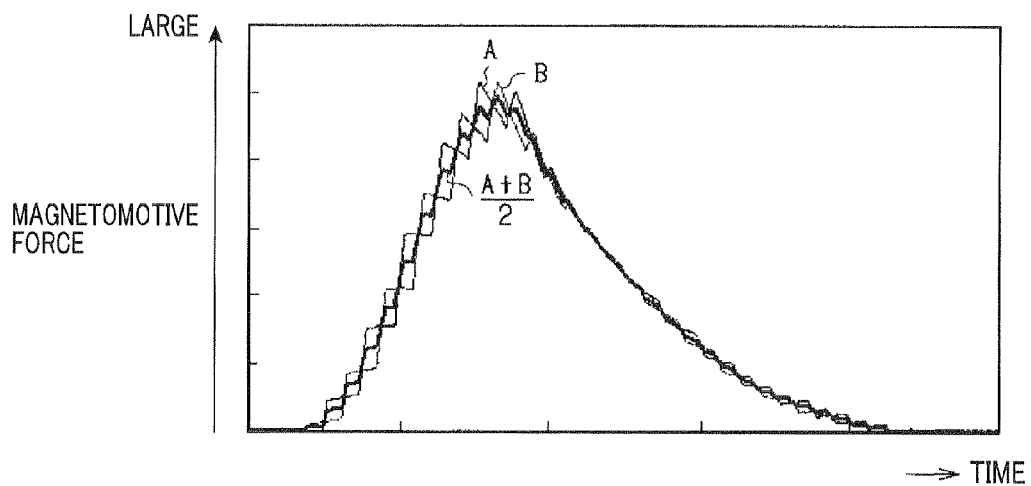

As can be seen from FIG. 13, in the present embodiment, by offsetting the phases of the first and second carrier signals CA and CB from each other by T/2 (i.e., half the period T of the carrier signals CA and CB), it becomes possible to eliminate the carrier first harmonic from both the resultant magnetomotive force of the first and second coils 20$1 and 20$2 and the resultant magnetomotive force of the third and fourth coils 20$3 and 20$4. Consequently, it also becomes possible to eliminate the carrier first harmonic from both the resultant flux linkage of the pair of the first and second coils 20$1 and 20$2 and the resultant flux linkage of the pair of the third and fourth coils 20$3 and 20$4, thereby reducing the iron loss of the SR motor 10 due to the carrier first harmonic. In addition, FIG. 14 gives an enlarged view of the synthesized waveform shown in (b) of FIG. 13.

Figure 15:
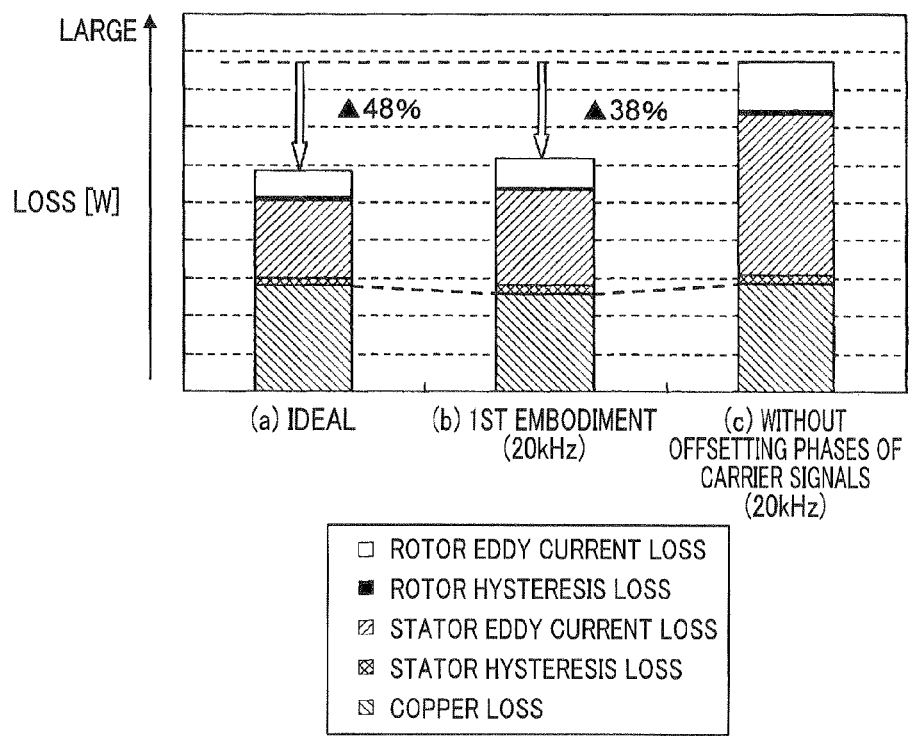

FIG. 15 illustrates the reduction of losses of the SR motor 10 achieved according to the present embodiment.

More specifically, in FIG. 15, (a) shows the details of the various losses of the SR motor 10 when the applied voltages of the first to the fourth $-phase coils 20$1-20$4 are in the form of an ideal sine wave; (b) shows the details of the various losses of the SR motor 10 when the applied voltages of the first to the fourth $-phase coils 20$1-20$4 are controlled according to the present embodiment, i.e., controlled with the phases of the first and second carrier signals CA and CB offset from each other by T/2; (c) shows the details of the various losses of the SR motor 10 when the applied voltages of the first to the fourth $-phase coils 20$1-20$4 are controlled without offsetting the phases of the first and second carrier signals CA and CB from each other. In addition, in both the cases (b) and (c) shown in FIG. 15, the frequency of the first and second carrier signals CA and CB is set to 20 kHz.

Figure 16:
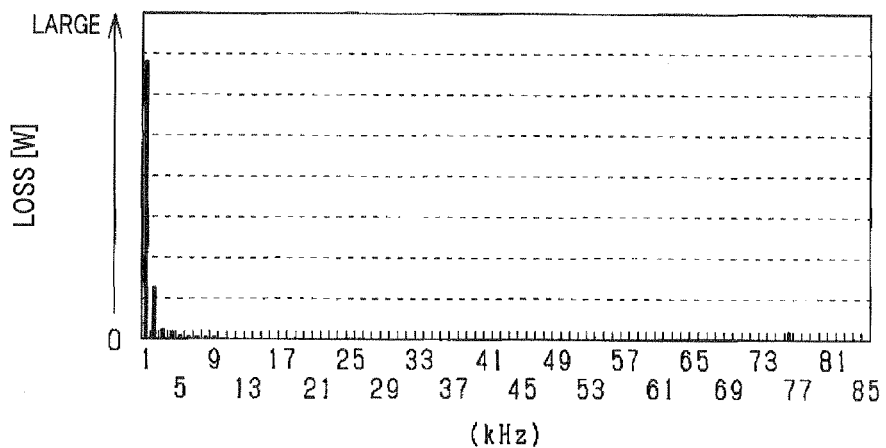
Figure 16:
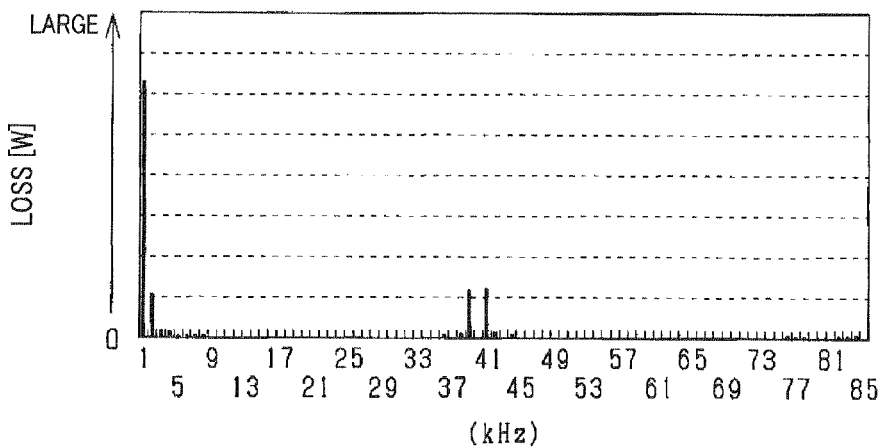
Figure 16:
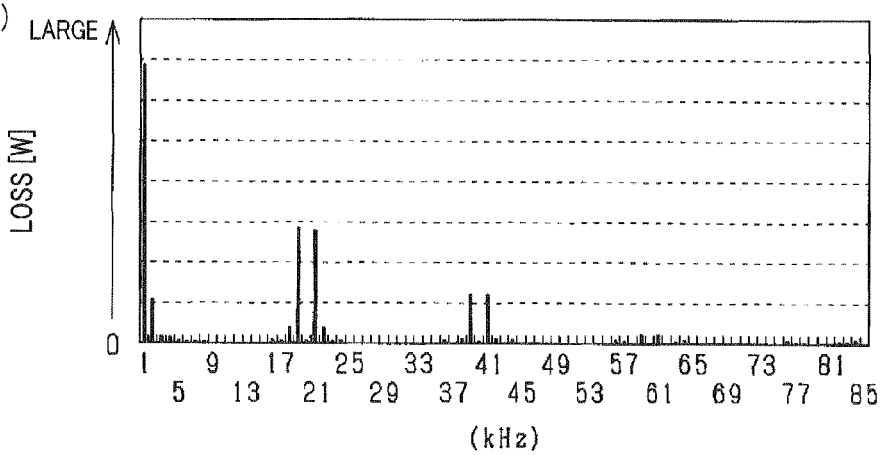

FIG. 16 shows the results of performing a frequency analysis (e.g., FFT) on the eddy current loss in the stator 12 of the SR motor 10 in each of the three cases (a), (b) and (c) described above with reference to FIG. 15.

As can be seen from FIG. 15, according to the present embodiment, it is possible to considerably reduce, among others, the eddy current loss in the stator 12 of the SR motor 10. In particular, as can be seen from FIG. 16, it is possible to eliminate the carrier first harmonic (or the harmonic having a frequency in the vicinity of 20 kHz) from the eddy current loss in the stator 12 of the SR motor 10.

According to the present embodiment, it is possible to achieve the following advantageous effects.

As described above, in the present embodiment, the SR motor 10 includes the stator 12 and the rotor 14 that is arranged so as to be rotatable relative to the stator 12. The stator 12 has the plurality of pairs of opposing teeth 18$1 and 18$2 ($=U, V, W). Each pair of the opposing teeth 18$1 and 18$2 has the first to the fourth coils 20$1-20$ of the same phase wound thereon. Each of the teeth 18$1 and 18$2 of the stator 12 has two of the same-phase coils 20$1-20$4 wound thereon; the two same-phase coils are divided into two voltage application targets. More specifically, the tooth 18$1 has wound thereon both the first and second $-phase coils 20$1 and 20$2, each of which makes up one voltage application target. Similarly, the tooth 18$2 has wound thereon both the third and fourth $-phase coils 20$3 and 20$4, each of which makes up one voltage application target. The control apparatus includes the voltage adjusters, the controller 50 and the carrier signal generator 50d (more strictly speaking, the carrier signal generator 50d of the controller 50 in the present embodiment). Each of the voltage adjusters adjusts the voltage applied to a corresponding one of the voltage application targets on the same tooth of the stator 12. More specifically, the voltage adjuster made up of the first and second $-phase switching elements S$1 and S$2 and the first and second $-phase diodes D$1 and D$2 adjusts the voltage applied to the first $-phase coil 20$1 on the first $-phase tooth 18$1 (or the voltage applied to the third $-phase coil 20$3 on the second $-phase tooth 18$2); the voltage adjuster made up of the third and fourth $-phase switching elements S$3 and S$4 and the third and fourth $-phase diodes D$3 and D$4 adjusts the voltage applied to the second $-phase coil 20$2 on the first $-phase tooth 18$1 (or the voltage applied to the fourth $-phase coil 20$4 on the second $-phase tooth 18$2). The controller 50 controls each of the voltage adjusters via the pulse-width modulation based on comparison between the command signal α$ and the corresponding one of the carrier signals CA and CB, thereby controlling the voltage applied to the corresponding voltage application target to the command voltage V$* that is indicated by the command signal α$. The carrier signal generator 50d generates the carrier signals CA and CB so that for each pair of the voltage application targets on the same tooth of the stator 12 (e.g., the pair of the first and second $-phase coils 20$1 and 20$2 on the same tooth 18$1), the two carrier signals CA and CB which respectively correspond to the pair of the voltage application targets are offset in phase from each other.

With the above configuration, since the controller 50 controls each of the voltage adjusters via the pulse-width modulation based on comparison between the command signal α$ and the corresponding carrier signal CA or CB, it would be easy for the waveform of the flux linkage ψ$ of the corresponding voltage application target (i.e., the $-phase coil 20$1, 20$2, 20$3 or 20$4) to contain the harmonics which cause the iron loss of the SR motor 10 to increase.

However, according to the present embodiment, the carrier signal generator 50d generates the carrier signals CA and CB so that for each pair of the voltage application targets on the same tooth of the stator 12 (e.g., the pair of the first and second $-phase coils 20$1 and 20$2 on the same tooth 18$1), the carrier signals CA and CB which respectively correspond to the pair of the voltage application targets are offset in phase from each other. Consequently, it becomes possible to smooth the change of the resultant flux linkage of the pair of the voltage application targets, thereby reducing the iron loss of the SR motor 10 due to the harmonics.

Moreover, with the above configuration, since the pair of the voltage application targets are arranged on the same tooth of the stator 12, it becomes possible to increase the magnetic fluxes ($\phi$1-$\phi$6) that flow in the magnetic circuit common to the pair of the voltage application targets and contribute to smoothing the change of the resultant flux linkage of the pair of the voltage application targets. That is, it becomes possible to more effectively smooth the change of the resultant flux linkage of the pair of the voltage application targets, thereby more effectively reducing the iron loss of the SR motor 10 due to the harmonics.

In addition, it should be noted that the effect of offsetting the phases of the carrier signals CA and CB according to the present embodiment is greater than the effect of increasing the frequency of the carrier signals CA and CB on reduction of the iron loss of the SR motor 10 due to the harmonics.

Further, in the present embodiment, the carrier signal generator 50d generates the carrier signals CA and CB so that for each pair of the voltage application targets on the same tooth of the stator 12 (e.g., the pair of the first and second $-phase coils 20$1 and 20$2 on the same tooth 18$1), the two carrier signals CA and CB which respectively correspond to the pair of the voltage application targets are offset in phase from each other by $T/2^M$, where T is the period of the carrier signals CA and CB and M is an integer not less than 1.

With the above configuration, it is possible to eliminate the carrier $2^{(M-1)}$-th harmonic from the resultant flux linkage of each pair of the voltage application targets.

In particular, with M set to 1, the carrier signals CA and CB are offset from each other by T/2 (i.e., half the period T of the carrier signals CA and CB), thereby eliminating the carrier first (i.e., $2^{(1-1)}$-th) harmonic from the resultant flux linkage of each pair of the voltage application targets.

In the present embodiment, each of the voltage adjusters includes an upper arm switching element, a lower arm switching element, an upper arm rectifying element and a lower arm rectifying element. The upper arm switching element (e.g., the first $-phase switching element S$1) is connected between one end of the corresponding voltage application target (e.g., the first $-phase coil 20$1) and the positive terminal of the high-voltage battery 30. The lower arm switching element (e.g., the second $-phase switching element S$2) is connected between the other end of the corresponding voltage application target (e.g., the first $-phase coil 20$1) and the negative terminal of the high-voltage battery 30. The upper arm rectifying element (e.g., the first $-phase diode D$1) is connected between one end of the upper arm switching element (e.g., the first $-phase switching element S$1) on the opposite side to the corresponding voltage application target (e.g., the first $-phase coil 20$1) and a junction point between the corresponding voltage application target and the lower arm switching element (e.g., the second $-phase switching element S$2); the upper arm rectifying element allows electric current to flow in a direction from the lower arm switching element to the upper arm switching element while blocking electric current from flowing in the reverse direction. The lower arm rectifying element (e.g., the second $-phase diode D$2) is connected between one end of the lower arm switching element (e.g., the second $-phase switching element S$2) on the opposite side to the corresponding voltage application target (e.g., the first $-phase coil 20$1) and a junction point between the corresponding voltage application target and the upper arm switching element (e.g., the first $-phase switching element S$1); the lower arm rectifying element also allows electric current to flow in the direction from the lower arm switching element to the upper arm switching element while blocking electric current from flowing in the reverse direction. Moreover, the controller 50 controls, for each of the voltage adjusters, the on/off operation of at least one of the upper and lower arm switching elements (e.g., the first and second $-phase switching elements S$1 and S$2) of the voltage adjuster via the pulse-width modulation, thereby controlling the voltage applied to the corresponding voltage application target (e.g., the first $-phase coil 20$1) to the command voltage V$*.

With the above configuration, it becomes possible to apply the pair of the positive voltage [Vdc] and the zero voltage and the pair of the negative voltage [−Vdc] and the zero voltage to each of the voltage application targets (i.e., the first to the fourth $-phase coils 20$1-20$4) according to the sign of the command signal α$. Consequently, it becomes possible to accurately control the average applied voltage of each of the voltage application targets for each cycle of the corresponding carrier signal CA or CB to the command voltage V$*. As a result, it becomes possible to make the waveforms of the flux linkages ψ$ of the voltage application targets approximate to a sine waveform, thereby reducing the iron loss of the SR motor 10 due to the harmonics included in the flux linkages ψ$.

In addition, with the above configuration, it is possible to considerably reduce the variation in the electric current flowing in each of the voltage application targets for each cycle of the corresponding carrier signal CA or CB. Consequently, when the amount of offsetting the phases of the carrier signals CA and CB is deviated from T/2 due to some cause, it is possible to prevent the degree of eliminating the carrier first harmonic included in the waveforms of the flux linkages ψ$ of the voltage application targets from becoming too low.

In the present embodiment, the command voltage V$* is set so as to be in the form of a sine wave both in its rising periods and in its falling periods and have its waveform continuous during each cycle of the electrical angle θe of the rotor 14.

With the above configuration, it is possible to make the change with time of the flux linkages ψ$ of the voltage application targets gentle, thereby more effectively reducing the iron loss of the SR motor 10 due to the harmonics of the flux linkages ψ$.

[Second Embodiment]

This embodiment illustrates a control apparatus which has a similar configuration to the control apparatus according to the first embodiment; accordingly, only the differences therebetween will be described hereinafter.

Figure 17:
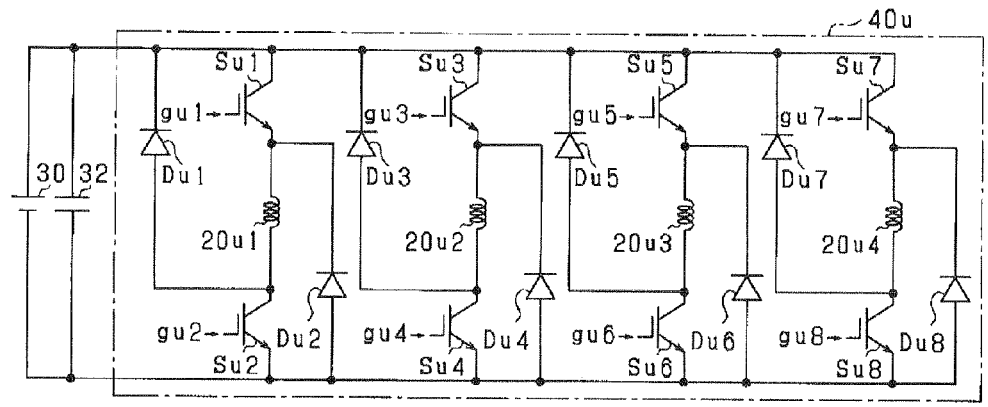
FIG. 17 is a schematic view illustrating the configuration of a control apparatus according to a second embodiment.

FIG. 17 shows the overall configuration of the control apparatus according to the present embodiment.

The control apparatus includes a U-phase electric power conversion circuit 40u, a V-phase electric power conversion circuit 40v and a W-phase electric power conversion circuit 40w, all of which have the same configuration. Therefore, for the sake of avoiding redundancy, among the three circuits 40u-40w, only the U-phase electric power conversion circuit 40u is shown in FIG. 17 and will be described hereinafter.

As shown in FIG. 17, in the present embodiment, the U-phase electric power conversion circuit 40u includes first to eighth U-phase switching elements Su1-Su8 and first to eighth U-phase diodes Du1-Du8.

Specifically, a junction point between the first U-phase switching element Su1 and the second U-phase diode Du2 is connected, via the first U-phase coil 20u1, to a junction point between the first U-phase diode Du1 and the second U-phase switching element Su2. Moreover, the emitter of the first U-phase switching element Su1 is connected to the cathode of the second U-phase diode Du2; the collector of the first U-phase switching element Su1 is connected to the positive terminal of the high-voltage battery 30; the anode of the second U-phase diode Du2 is connected to the negative terminal of the high-voltage battery 30. On the other hand, the anode of the first U-phase diode Du1 is connected to the collector of the second U-phase switching element Su2; the cathode of the first U-phase diode Du1 is connected to the positive terminal of the high-voltage battery 30; the emitter of the second U-phase switching element Su2 is connected to the negative terminal of the high-voltage battery 30.

As to the third to the eighth U-phase switching elements Su3-Su8 and the third to the eighth U-phase diodes Du3-Du8, they are connected in the same manner as the first and second switching elements Su1 and Su2 and the first and second diodes Du1 and Du2 described above. Therefore, for the sake of avoiding redundancy, description of the electrical connection between the third to the eighth U-phase switching elements Su3-Su8 and the third to the eighth U-phase diodes Du3-Du8 is omitted hereinafter.

In addition, in the present embodiment, the first, third, fifth, and seventh $-phase ($=U, V, W) diodes D$1, D$3, D$5 and D$7 can be regarded as upper arm rectifying elements of the control apparatus; the second, fourth, sixth and eighth $-phase diodes D$2, D$4, D$6 and D$8 can be regarded as lower arm rectifying elements of the control apparatus; the first, third, fifth, and seventh $-phase switching elements S$1, S$3, S$5 and S$7 can be regarded as upper arm switching elements of the control apparatus; the second, fourth, sixth and eighth $-phase switching elements S$2, S$4, S$6 and S$8 can be regarded as lower arm switching elements of the control apparatus. Moreover, each of the first to the fourth $-phase coils 20$1-20$4 can be regarded as one voltage application target; the first and second $-phase switching elements S$1 and S$2 and the first and second $-phase diodes D$1 and D$2 can be regarded as together making up a voltage adjuster for adjusting voltage applied to the voltage application target made up of the first $-phase coil 20$1; the third and fourth $-phase switching elements S$3 and S$4 and the third and fourth $-phase diodes D$3 and D$4 can be regarded as together making up a voltage adjuster for adjusting voltage applied to the voltage application target made up of the second $-phase coil 20$2; the fifth and sixth $-phase switching elements S$5 and S$6 and the fifth and sixth $-phase diodes D$5 and D$6 can be regarded as together making up a voltage adjuster for adjusting voltage applied to the voltage application target made up of the third $-phase coil 20$3; the seventh and eighth $-phase switching elements S$7 and S$8 and the seventh and eighth $-phase diodes D$7 and D$8 can be regarded as together making up a voltage adjuster for adjusting voltage applied to the voltage application target made up of the fourth $-phase coil 20$4.

Next, a process of the controller 50 for generating the control signals g$# ($=U, V, W; #=1, 2, 3, 4, 5, 6, 7, 8) according to the present embodiment will be described with reference to FIG. 18.

It should be noted that the process of the controller 50 for generating the control signals g$# is the same but performed separately for all the three phases of the SR motor 10.

Figure 18:
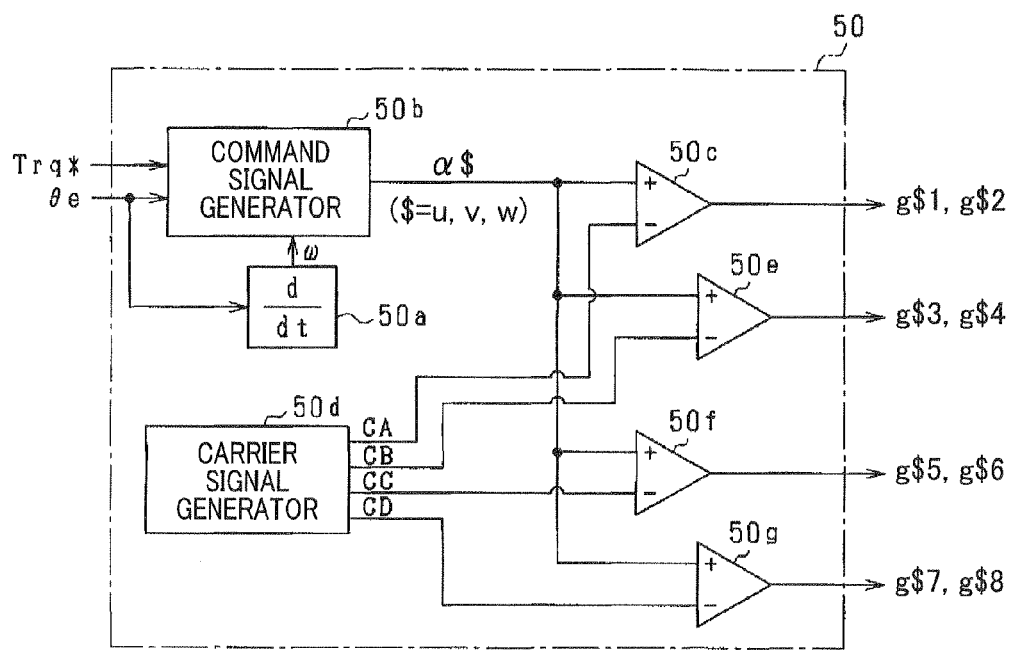
FIG. 18 is a block diagram illustrating a process of a controller of the control apparatus according to the second embodiment for generating control signals for controlling switching elements of the control apparatus.

As shown in FIG. 18, in the present embodiment, the controller 50 functionally includes an electrical angular speed computer 50a, a command signal generator 50b, a carrier signal generator 50d, a first PWM (Pulse-Width Modulation) comparator 50c, a second PWM comparator 50e, a third PWM comparator 50f and a fourth PWM comparator 50g.

In the present embodiment, the electrical angular speed computer 50a, the command signal generator 50b, the carrier signal generator 50d and the first and second PWM comparators 50c and 50e are respectively identical to those in the first embodiment. Therefore, for the sake of avoiding redundancy, only the third and fourth PWM comparators 50f and 50g will be described hereinbelow.

The third PWM comparator 50f has a non-inverting input terminal via which the command signal α$ generated by the command signal generator 50b is inputted and an inverting input terminal via which a third carrier signal CC generated by the carrier signal generator 50d is inputted. The third PWM comparator 50f generates the control signals g$5 and g$6 for controlling the on/off operations of the fifth and sixth $-phase switching elements S$5 and S$6 via a pulse-width modulation based on comparison between the command signal α$ and the third carrier signal CC.

Similarly, the fourth PWM comparator 50g has a non-inverting input terminal via which the command signal α$ generated by the command signal generator 50b is inputted and an inverting input terminal via which a fourth carrier signal CD generated by the carrier signal generator 50d is inputted. The fourth PWM comparator 50g generates the control signals g$7 and g$8 for controlling the on/off operations of the seventh and eighth $-phase switching elements S$7 and S$8 via a pulse-width modulation based on comparison between the command signal α$ and the fourth carrier signal CD.

Next, the manner of generating the first to the fourth carrier signals CA-CD by the carrier signal generator 50d of the controller 50 according to the present embodiment will be described with reference to FIG. 19.

Figure 19:
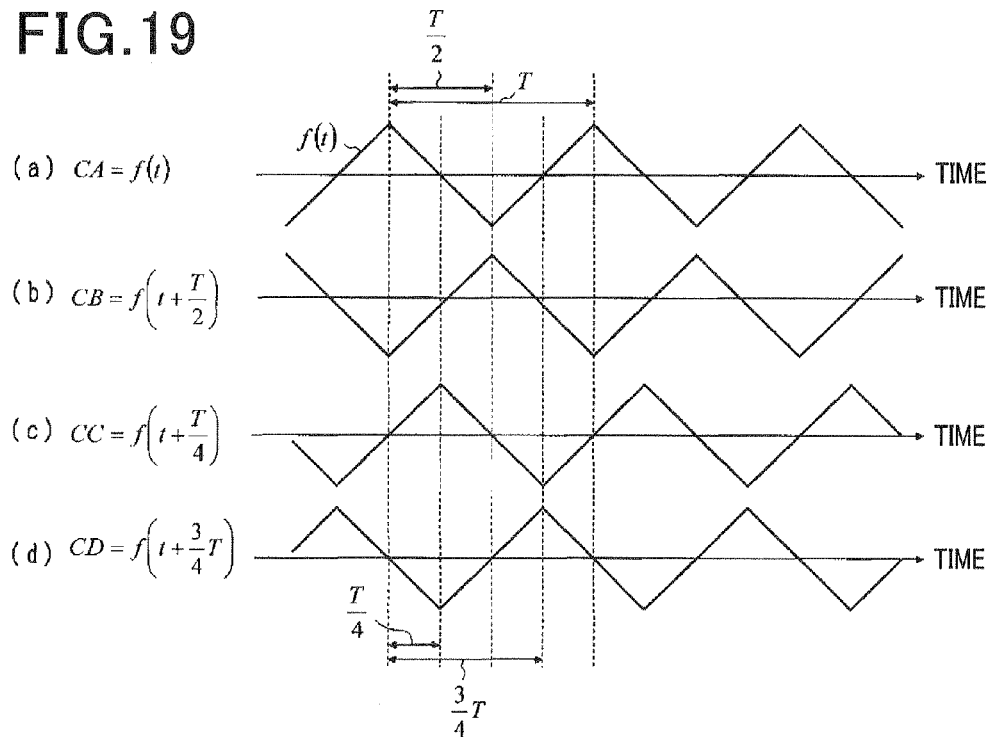
FIG. 19 is a graphical representation illustrating first, second, third and fourth carrier signals generated by the controller according to the second embodiment.

In addition, in FIG. 19: (a) shows the change with time of the first carrier signal CA; (b) shows the change with time of the second carrier signal CB; (c) shows the change with time of the third carrier signal CC; and (d) shows the change with time of the fourth carrier signal CD.

As shown in FIG. 19, in the present embodiment, the carrier signal generator 50d of the controller 50 generates the first to the fourth carrier signals CA-CD in the form of a triangular wave. Each of the first to the fourth carrier signals CA-CD has its minimum value set to [−1] and its maximum value set to [1]; all of the first to the fourth carrier signals CA-CD have the same frequency of, for example, 20 kHz.

Moreover, in the present embodiment, the carrier signal generator 50d generates the first to the fourth carrier signals CA-CD so that: the first and second carrier signals CA and CB, which respectively correspond to the first and second $-phase coils 20$1 and 20$2 that are both wound on the first $-phase coil 18$1, are offset from each other by T/2; the third and fourth carrier signals CC and CD, which respectively correspond to the third and fourth $-phase coils 20$3 and 20$4 that are both wound on the second $-phase tooth 18$2 of the stator 12, are offset from each other by T/2; the first and third carrier signals CA and CC, which respectively correspond to the first and third $-phase coils 20$1 and 20$3 that are respectively wound on the opposing pair of the first and second $-phase tooth 18$1 and 18$2 of the stator 12, are offset from each other by $T/2^N$; the second and fourth carrier signals CB and CD, which respectively correspond to the second and fourth $-phase coils 20$2 and 20$4 that are respectively wound on the opposing pair of the first and second $-phase tooth 18$1 and 18$2 of the stator 12, are offset from each other by $T/2^N$, where T is the period of the first to the fourth carrier singles CA-CD and N is an integer not less than 2. More particularly, in the present embodiment, N is set to 2 so that: the first and third carrier signals CA and CC are offset in phase from each other by T/4; and the second and fourth carrier signals CB and CD are also offset in phase from each other by T/4.

In other words, in the present embodiment, for each corresponding pair of the voltage application targets which are respectively wound on one opposing pair of the salient poles of the stator 12 (e.g., the pair of the first and third $-phase coils 20$1 and 20$3 which are respectively wound on the opposing pair of the first and second $-phase tooth 18$1 and 18$2), the two carrier signals respectively corresponding to the pair of the voltage application targets (e.g., the carrier signals CA and CC respectively corresponding to the pair of the first and third $-phase coils 20$1 and 20$3) are offset in phase from each other by $T/2^N$.

Next, the advantageous effects of offsetting the phases of the first to the fourth carrier signals CA-CD from one another according to the present embodiment will be described with reference to FIG. 20.

Figure 20:
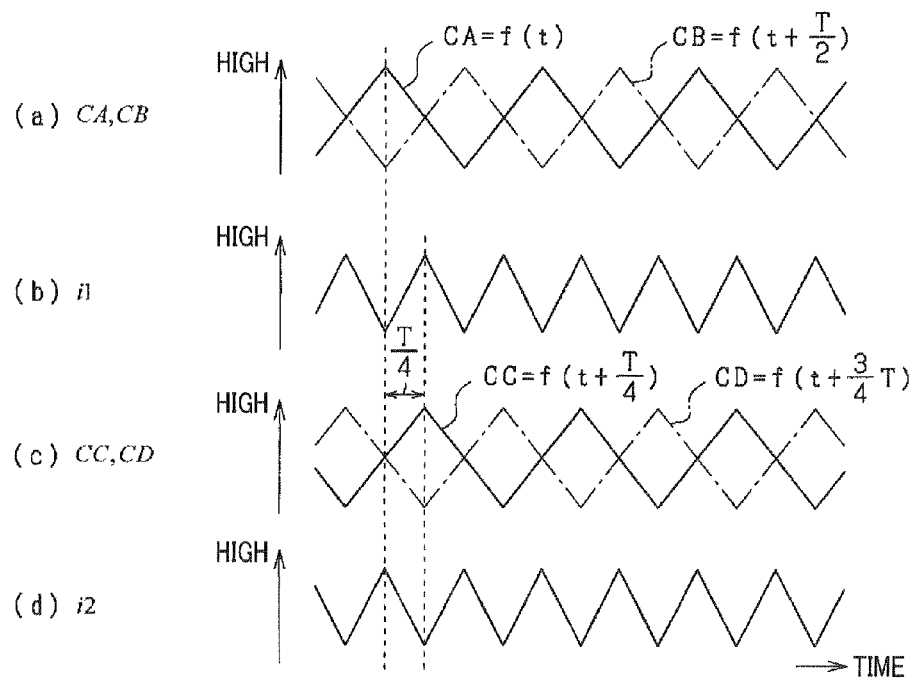
FIG. 20 is a time chart illustrating the advantageous effects of offsetting the phases of the first to the fourth carrier signals from one another.

In addition, in FIG. 20: (a) shows both the changes with time of the first and second carrier signals CA and CB; (b) shows the change with time of the carrier second harmonic (i.e., the harmonic having a frequency nearly twice the frequency of the carrier signals CA-CD) included in the electric current i1 flowing in the first and second $-phase coils 20$1 and 20$2; (c) shows both the changes with time of the third and fourth carrier signals CC and CD; and (d) shows the change with time of the carrier second harmonic included in the electric current i2 flowing in the third and fourth $-phase coils 20$3 and 20$4.

As can be seen from FIG. 20, in the present embodiment, by offsetting the phases of the first and second carrier signals CA and CB respectively from those of the third and fourth carrier signals CC and CD by T/4 (i.e., $T/2^2$), the difference in phase between the carrier second (i.e., $2^{(2-1)}$-th) harmonic included in the electric current it flowing in the first and second $-phase coils 20$1 and 20$2 and the carrier second harmonic included in the electric current i2 flowing in the third and fourth $-phase coils 20$3 and 20$4 becomes equal to 180°. Consequently, with the above difference equal to 180° and the first and second $-phase coils 20$1 and 20$2 magnetically connected with the third and fourth $-phase coils 20$3 and 20$4, it becomes possible to eliminate the carrier second harmonic as well as the carrier first harmonic from the resultant flux linkage of the first to the fourth $-phase coils 20$1-20$4, thereby reducing the iron loss of the SR motor 10 due to the harmonics.

[Third Embodiment]

This embodiment illustrates a control apparatus which has almost the same configuration as the control apparatus according to the first embodiment; accordingly, only the differences therebetween will be described hereinafter.

In the first embodiment, the carrier signal generator 50d of the controller 50 generates each of the first and second carrier signals CA and CB in a continuous manner (see FIG. 11).

In comparison, in the present embodiment, as shown in FIG. 21, the carrier signal generator 50d of the controller 50 generates each of the first and second carrier signals CA and CB in an intermittent manner.

Specifically, in FIG. 21: (a) shows the change with time of the command signal α$; (b) shows the change with time of the first carrier signal CA; and (c) shows the change with time of the second carrier signal CB.

As shown in FIG. 21, in the present embodiment, each cycle of the electrical angle θe of the rotor 14 of the SR motor 10 includes a carrier signal-generating period θw (e.g., the period between the time instants t1 and t2) and a carrier signal cessation period (e.g., the period between the time instants T2 and t3). During the carrier signal-generating period (or the energization-commanding period) θw, the carrier signal generator 50d continuously generates both the first and second carrier signals CA and CB such that the phases of the first and second carrier signals CA and CB are offset from each other by T/2 (i.e., half the period T of the carrier signals CA and CB). In contrast, during the carrier signal cessation period, the carrier signal generator 50d ceases generating the first and second carrier signals CA and CB.

With the above manner of generating the first and second carrier signals CA and CB according to the present embodiment, it is possible to achieve the same advantageous effects achievable with that according to the first embodiment.

While the above particular embodiments have been shown and described, it will be understood by those skilled in the art that various modifications, changes, and improvements may be made without departing from the spirit of the invention.

(1) For example, the carrier signal generator 50d of the controller 50 may also generate the carrier signals in the following manners different from those described in the previous embodiments.

(1.1) In the previous embodiments, each of the teeth of the stator 12 of the SR motor 10 has two coils of the same phase wound thereon.

However, each of the teeth of the stator 12 may have three or more coils of the same phase wound thereon; each of the three or more coils makes up one voltage application target.

For example, in the case of each of the teeth of the stator 12 having three coils wound thereon, the carrier signal generator 50d may generate three carrier signals which respectively correspond to the three coils, so that one of the three carrier signals is offset in phase from both the remaining carrier signals by T/2 (i.e., half the period T of the carrier signals). In this case, it is possible to eliminate the carrier first (i.e., $2^{(1-1)}$-th) harmonic from the resultant flux linkage of the three coils, thereby reducing the iron loss of the stator 12.

In addition, in the above case, the carrier signal generator 50d may also generate the three carrier signals so that first and second ones of the three carrier signals are offset in phase from each other by T/2, and the remaining third carrier signal is offset in phase from each of the first and second carrier signals by T/4.

(1.2) Each of the teeth of the stator 12 may have four coils of the same phase wound thereon; each of the four coils makes up one voltage application target.

In this case, the carrier signal generator 50d may generate first to fourth carrier signals which respectively correspond to the four coils, so that: the first and second carrier signals are offset in phase from each other by T/2; the third and fourth carrier signals are offset in phase from each other by T/2; the first and third carrier signals are offset in phase from each other by T/4; and the second and fourth carrier signals are offset in phase from each other by T/4. Consequently, it becomes possible to eliminate the carrier second harmonic as well as the carrier first harmonic from the resultant flux linkage of the four coils.

(1.3) In the first embodiment, M is set to 1 so that the first and second carrier signals CA and CB are offset in phase from each other by T/2 (i.e., $T/2^1$).

However, M may also be set to other integers greater than 1. For example, M may be set to 3 so that the first and second carrier signals CA and CB are offset in phase from each other by T/8 (i.e., $T/2^3$). Consequently, it becomes possible to eliminate the carrier fourth (i.e., $2^{(3-1)}$-th) harmonic from the resultant flux linkage of the first and second $-phase coils 20$1 and 20$2 wound on the first $-phase tooth 18$1 (or the third and fourth $-phase coils 20$3 and 20$4 wound on the second $-phase tooth 18$2).

(1.4) In the second embodiment, N is set to 2 so that the first and second carrier signals CA and CB are respectively offset from the third and fourth carrier signals CC and CD by T/4 (i.e., $T/2^2$).

However, N may also be set to other integers greater than 2. For example, N may be set to 3 so that the first and second carrier signals CA and CB are respectively offset from the third and fourth carrier signals CC and CD by T/8 (i.e., $T/2^3$). Consequently, it becomes possible to eliminate the carrier fourth (i.e., $2^{(3-1)}$-th) harmonic from the resultant flux linkage of the first to the fourth $-phase coils 20$1-20$4.

(2) In the first embodiment, the closed circuit for applying the zero voltage to the first and third $-phase coils 20$1 and 20$3 is formed by turning the first $-phase switching element S$1 ON while turning the second $-phase switching element S$2 OFF (see FIG. 8).

However, the zero voltage may also be applied to the first and third $-phase coils 20$1 and 20$3 via a closed circuit that is formed by turning the first $-phase switching element S$1 OFF while turning the second $-phase switching element S$2 ON.

Figure 6:
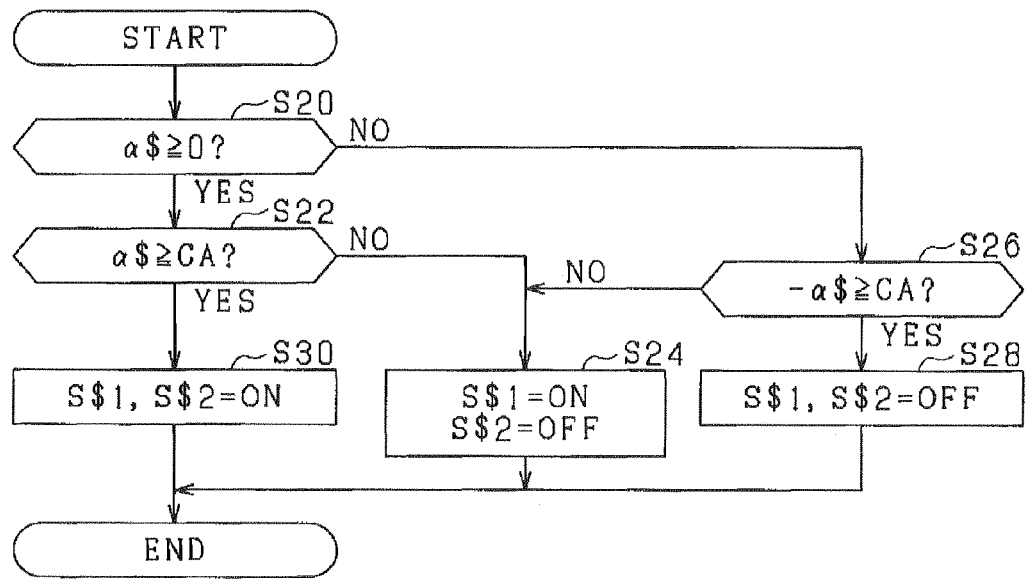
FIG. 6 is a flow chart illustrating a process of the controller for controlling voltages applied to the coils of the stator to the command voltage.

(3) In the first embodiment, the pair of the positive voltage [Vdc] and the zero voltage and the pair of the negative voltage [−Vdc] and the zero voltage are selectively applied to the first and third $-phase coils 20$1 and 20$3 by performing the process shown in FIG. 6. More specifically, according to the process, if the magnitude of the command signal α$ is higher than or equal to zero, the pair of the positive voltage [Vdc] and the zero voltage is applied to the first and third $-phase coils 20$1 and 20$3 by keeping the upper arm switching element S$1 on the ON state while controlling the on/off operation of the lower arm switching element S$2 via the pulse-width modulation; otherwise, the pair of the negative voltage [−Vdc] and the zero voltage is applied to the first and third $-phase coils 20$1 and 20$3 by keeping the lower arm switching element S$2 on the OFF state while controlling the on/off operation of the upper arm switching element S$1 via the pulse-width modulation.

However, instead of the process shown in FIG. 6, it is also possible to use another process according to which: if the magnitude of the command signal α$ is higher than or equal to zero, the pair of the positive voltage [Vdc] and the zero voltage is applied to the first and third $-phase coils 20$1 and 20$3 by keeping the lower arm switching element S$2 on the ON state while controlling the on/off operation of the upper arm switching element S$1 via the pulse-width modulation; otherwise, the pair of the negative voltage [−Vdc] and the zero voltage is applied to the first and third $-phase coils 20$1 and 20$3 by keeping the upper arm switching element S$1 on the OFF state while controlling the on/off operation of the lower arm switching element S$2 via the pulse-width modulation.

(4) It is also possible to use, instead of the process shown in FIG. 6, still another process according to which: if the magnitude of the command signal α$ is higher than or equal to zero, the pair of the positive voltage [Vdc] and the zero voltage is applied to the first and third $-phase coils 20$1 and 20$3 by keeping one of the upper and lower arm switching elements S$1 and S$2 on the ON state while controlling the on/off operation of the other switching element via the pulse-width modulation; otherwise, the pair of the negative voltage [−Vdc] and the zero voltage is applied to the first and third $-phase coils 20$1 and 20$3 by keeping the one switching element on the OFF state while controlling the on/off operation of the other switching element via the pulse-width modulation. That is, according to this process, one of the upper and lower arm switching elements S$1 and S$2 is kept on the ON state if the magnitude of the command signal α$ is higher than or equal to zero and on the OFF state otherwise; the on/off operation of the other switching element is controlled via the pulse-width modulation so as to apply to the first and third $-phase coils 20$1 and 20$3 the pair of the positive voltage [Vdc] and the zero voltage if the magnitude of the command signal α$ is higher than or equal to zero and the pair of the negative voltage [−Vdc] and the zero voltage otherwise.

(5) In the first embodiment, the command voltage V$* is set so as to have a sine waveform during each cycle of the electrical angle θe of the rotor 14 (see FIG. 4).

However, the command voltage V$* may be set to have, during each cycle of the electrical angle θe of the rotor 14, other waveforms such as a triangular waveform, a trapezoidal waveform or a P-sided polygonal waveform where P is an integer not less than 4.

(6) Furthermore, the command voltage V$* may be set in the following manners different from that described in the first embodiment.

(6.1) In the first embodiment, the command voltage V$* is set so as to gradually change both in its rising periods and in the falling periods.

However, the command voltage V$* may be set so as to gradually change only in its rising periods or in its falling periods.

(6.2) The command voltage V$* may also be set so as to gradually change neither in its rising periods nor in its falling periods.

In this case, it is still possible to achieve the advantageous effects of reducing the iron loss of the SR motor 10 due to harmonics by offsetting the phases of the carrier signals from one another.

(6.3) In the first embodiment, the command voltage V$* is set so as to have an ideal sine waveform during each cycle of the electrical angle θe of the rotor 14 (see FIG. 4).

However, the command voltage V$* may be set to have a slightly-distorted sine waveform that contains some harmonics.

Furthermore, the command voltage V$* may also be set to have a slightly-distorted triangular waveform that contains some harmonics or a slightly-distorted trapezoidal waveform that contains some harmonics.

(6.4) It is also possible to set the command voltage V$* so as to include a zero-voltage waveform during the energization-commanding period θw.

(7) In the first embodiment, the stator 12 is configured to have the six salient poles (or teeth). However, the stator 12 may be modified to have a different number (e.g., twelve) of salient poles.

Moreover, in the first embodiment, the rotor 14 is configured to have the four salient poles. However, the rotor 14 may be modified to have a different number (e.g., eight) of salient poles.

(8) In the previous embodiments, the carrier signals are set to have a triangular wave form. However, the carrier signals may be set to have different waveforms, such as a sawtooth waveform.

(9) In the previous embodiments, each of the upper and lower arm rectifying elements is implemented by a diode. However, each of the upper and lower arm rectifying elements may be implemented by other semiconductor elements which have a function of allowing electric current to flow in one direction while blocking electric current from flowing in the reverse direction.

(10) In the previous embodiments, each of the upper and lower arm switching elements is implemented by an IGBT. However, each of the upper and lower arm switching elements may be implemented by other semiconductor elements, such as a MOSFET (Metal-Oxide-Semiconductor Field-Effect Transistor) or a bipolar transistor.

(11) In the first embodiment, the DC power source is implemented by the high-voltage battery 30. However, the DC power source may be implemented by a combination of an AC power source and a rectifying circuit that rectifies AC voltage outputted from the AC power source into DC voltage.

Figure 2:
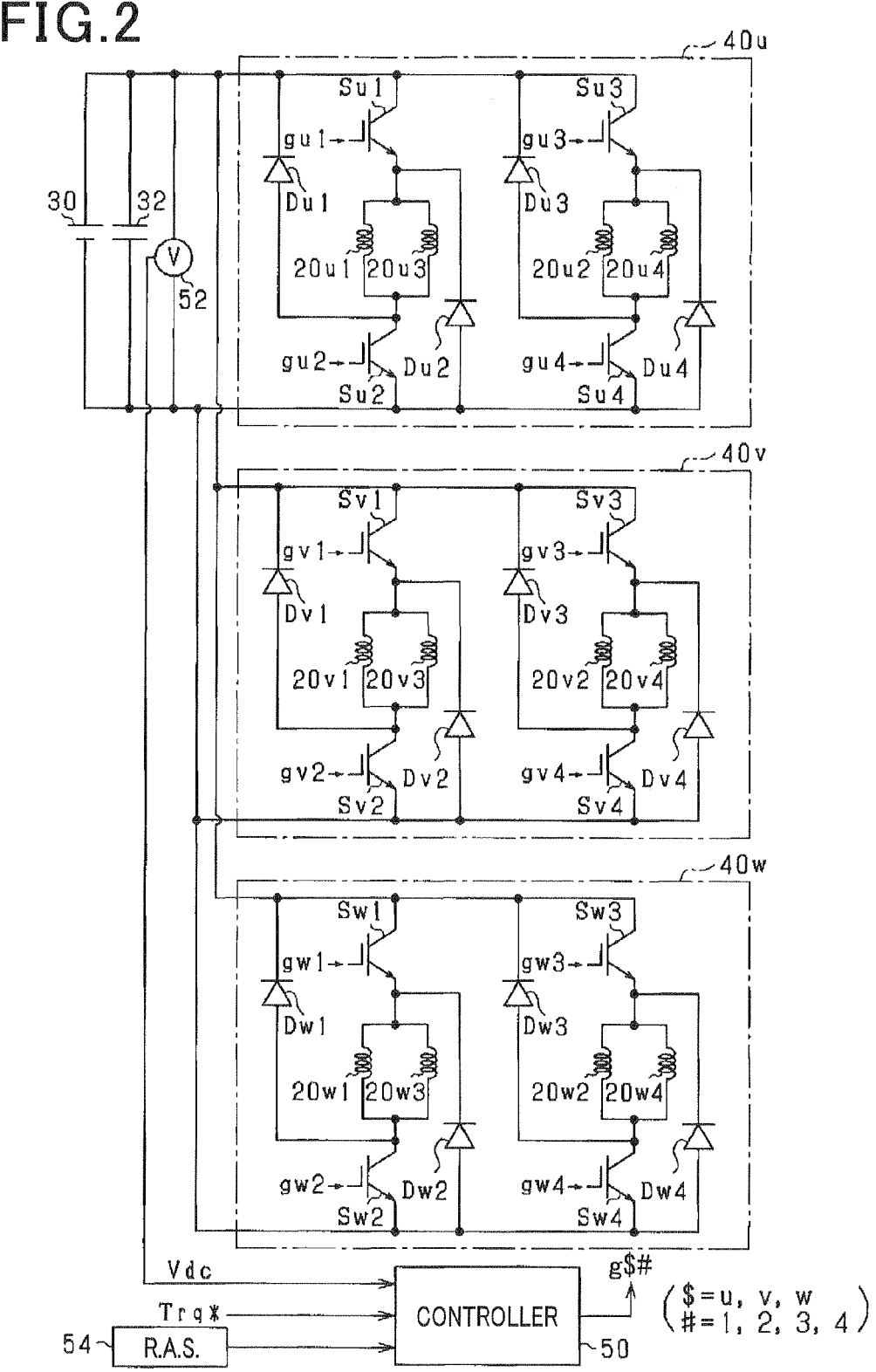
FIG. 2 is a schematic view illustrating the configuration of a control apparatus according to the first embodiment for controlling the SR motor.

(12) In the first embodiment, each of the voltage adjusters is configured into an asymmetric H-bridge drive circuit as shown in FIG. 2. However, each of the voltage adjusters may be configured into other circuits disclosed, for example, in pages 54-56 of "Drive circuits and control technologies for permanent magnetic motors and reluctance motors", Technical Report No. 1034 published by IEEJ (The Institute of Electrical Engineers of Japan). More specifically, those circuits disclosed in the above technical report include: an improved asymmetric H-bridge drive circuit as shown in FIG. 4.11; a shared-type asymmetric H-bridge drive circuit utilizing a general-purpose inverter, as shown in FIG. 4.13; and a C-dump converter as shown in FIG. 4.16 of the technical report.

(13) In the previous embodiments, the present invention is directed to the control apparatus for the SR motor 10 that is configured as a motor-generator functioning as a main motive power source in a motor vehicle. However, the present invention can also be applied to control apparatuses for other SR motors.

What is claimed is:

1. A control apparatus for a multi-phase, switched reluctance motor, the motor comprising a stator and a rotor that is arranged so as to be rotatable relative to the stator, the stator having a plurality of pairs of opposing salient poles, each pair of the opposing salient poles having a plurality of coils of the same phase wound thereon, wherein each of the salient poles of the stator has a predetermined number of the same-phase coils wound thereon, the predetermined number of the same-phase coils being divided into a plurality of voltage application targets, the control apparatus comprising:
- a plurality of voltage adjusters each of which adjusts a voltage applied to a corresponding one of the voltage application targets on the same salient pole of the stator;
- a controller that controls each of the voltage adjusters via a pulse-width modulation based on comparison between a command signal and a corresponding one of a plurality of carrier signals, thereby controlling the voltage applied to the corresponding voltage application target to a command voltage that is indicated by the command signal; and
- a carrier signal generator which generates the carrier signals so that for at least one pair of the voltage application targets on the same salient pole of the stator, two of the carrier signals which respectively correspond to the pair of the voltage application targets are offset in phase from each other.

2. The control apparatus as set forth in claim 1, wherein the carrier signal generator generates the carrier signals so that the two carrier signals are offset in phase from each other by $T/2^M$, where T is a period of the carrier signals and M is an integer not less than 1.

3. The control apparatus as set forth in claim 2, wherein $M=1$.

4. The control apparatus as set forth in claim 3, wherein the carrier signal generator generates the carrier signals so that for at least one pair of the voltage application targets which are respectively provided on one opposing pair of the salient poles of the stator, the two carrier signals which respectively correspond to the pair of the voltage application targets are offset in phase from each other by $T/2^N$, where N is an integer not less than 2.

5. The control apparatus as set forth in claim 1, wherein each cycle of electrical angle of the rotor of the motor includes a carrier signal-generating period and a carrier signal cessation period, and
- the carrier signal generator continuously generates the carrier signals during the carrier signal-generating period and ceases generating the carrier signals during the carrier signal cessation period.

6. The control apparatus as set forth in claim 1, wherein each of the voltage adjusters comprises:
- an upper arm switching element connected between one end of the corresponding voltage application target and a positive terminal of a DC power source;
- a lower arm switching element connected between the other end of the corresponding voltage application target and a negative terminal of the DC power source;
- an upper arm rectifying element connected between one end of the upper arm switching element on the opposite side to the corresponding voltage application target and a junction point between the corresponding voltage application target and the lower arm switching element, the upper arm rectifying element being configured to allow electric current to flow in a direction from the lower arm switching element to the upper arm switching element while blocking electric current from flowing in the reverse direction; and
- a lower arm rectifying element connected between one end of the lower arm switching element on the opposite side to the corresponding voltage application target and a junction point between the corresponding voltage application target and the upper arm switching element, the lower arm rectifying element also being configured to allow electric current to flow in the direction from the lower arm switching element to the upper arm switching element while blocking electric current from flowing in the reverse direction, and wherein
the controller controls, for each of the voltage adjusters, the on/off operation of at least one of the upper and lower arm switching elements of the voltage adjuster via the pulse-width modulation, thereby controlling the voltage applied to the corresponding voltage application target to the command voltage.

7. The control apparatus as set forth in claim 1, wherein the command voltage is in the form of a sine wave both in its rising periods and in its falling periods and has its waveform continuous during each cycle of electrical angle of the rotor of the motor.

* * * * *